(12) United States Patent
Langley

(10) Patent No.: US 11,647,754 B1
(45) Date of Patent: *May 16, 2023

(54) THREE SENSOR OVEN

(71) Applicant: John Langley, New Orleans, LA (US)

(72) Inventor: John Langley, New Orleans, LA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/541,813

(22) Filed: Dec. 3, 2021

Related U.S. Application Data

(63) Continuation of application No. 17/351,980, filed on Jun. 18, 2021, now Pat. No. 11,224,228.

(60) Provisional application No. 63/040,846, filed on Jun. 18, 2020.

(51) Int. Cl.
*A21B 1/40* (2006.01)
*A21B 1/02* (2006.01)
*A21B 1/52* (2006.01)

(52) U.S. Cl.
CPC .................. *A21B 1/40* (2013.01); *A21B 1/02* (2013.01); *A21B 1/52* (2013.01)

(58) Field of Classification Search
CPC ................ A21B 1/40; A21B 1/02; A21B 1/52
USPC ..................... 126/19 R, 21 A, 21 R
See application file for complete search history.

(56) References Cited

U.S. PATENT DOCUMENTS 5,365,043 A * 11/1994 Bradford .................. H05B 6/68
374/149
6,229,130 B1 * 5/2001 Furuta .................. H05B 6/6455
374/149

\* cited by examiner

*Primary Examiner* — Vivek K Shirsat
(74) *Attorney, Agent, or Firm* — Garvey, Smith & Nehrbass, Patent Attorneys, L.L.C.; Seth M. Nehrbass; Fabian M. Nehrbass

(57) ABSTRACT

An oven uses at least one infrared sensor located outside of the oven baking chamber to measure infrared light emissions from an oven floor, and includes apparatuses that defend infrared sensors and light sources from heat damage using for example baffles, shutters, remote location of the sensor from heat sources and powered ventilation, temperature control systems for ovens using at least one infrared sensor to control the temperature of an oven floor, and powered ventilation systems to keep oven walls cool.

19 Claims, 20 Drawing Sheets

THREE SENSOR OVEN

CROSS-REFERENCE TO RELATED APPLICATIONS

This is a continuation of U.S. patent application Ser. No. 17/351,980, filed Jun. 18, 2021 (issued as U.S. Pat. No. 11,224,228 on Jan. 18, 2022), which claims the benefit of U.S. Provisional Patent Application No. 63/040,846, filed Jun. 18, 2020, both of which are hereby incorporated herein by reference, and priority of which is hereby claimed.

STATEMENT REGARDING FEDERALLY SPONSORED RESEARCH OR DEVELOPMENT

Not applicable

REFERENCE TO A "MICROFICHE APPENDIX"

Not applicable

BACKGROUND OF THE INVENTION

1. Field of the Invention

The present invention relates to ovens, temperature sensing of ovens, and oven control systems.

BRIEF SUMMARY OF THE INVENTION

The present invention includes an apparatus for measuring the surface temperature of a high temperature (e.g., 100-1000 degrees F.) oven floor using an infrared sensor fixed in a cool (e.g., 50-140 degrees F.) location outside of the baking chamber of a high temperature oven, sensing infrared light emitted from portions of surfaces of oven floor not covered by the baking chamber or other oven structural elements, or sensing infrared light emitted by oven floor surfaces through ports or other openings in structural confines of an oven baking chamber, through insulation layers, through air ducts, vents, the structures that contain them, floor support structures, and other structures physically juxtaposed between the infrared sensor and the oven floor surface targeted by the infrared sensor for infrared light measurement for temperature monitoring. The size of the oven or oven floor is not limited in the present invention. Furthermore, although reference is made to high temperature ovens, the apparatus is not limited in use to high temperature ovens or to the sensing of high temperature oven floors.

Powered air ventilation, positive or negative, may be provided around the infrared sensor, and or in the space between the infrared sensor and the high temperature floor and or a port, and or between multiple ports in oven structures juxtaposed between the targeted oven floor surface emitting infrared light and the sensor. Ventilation may also be provided inside of or through ports in structures outside of or traversing the boundaries of the baking chamber or vents. In this way, ventilation with cool air may be provided to cool the infrared sensor itself and or a chamber containing the infrared sensor, and or any space between the infrared sensor and the oven floor, and or the space between the infrared sensor and ports, and or the space between multiple ports, and or the space inside of the port, to protect the sensor from heat damage, for example from hot gasses moving from the baking chamber and surface of the oven floor directly or through ports or other openings in the baking chamber, vents and or surrounding insulation and the structure that contains them. The sensor may be further defended from heat damage by baffles, or the like, positioned between the sensor and the top surface of the oven floor. Protection of the sensor may also be provided by a shutter or other mechanism that closes over a port or other opening, or otherwise obstructs hot baking chamber exhaust gas from moving through a port or other opening from damaging the heat sensitive sensor in the event of unplanned cessation of powered air ventilation caused by a primary power failure. The sensor may be further defended by a secondary battery power supply to power the ventilation system during a primary power source failure.

The present invention also includes an oven temperature control system that uses an infrared sensor to sense infrared light emitted from a surface of an oven floor. Sensor locations are not specified for such control systems. Infrared light emissions may be measured from the top surface, bottom surface, or side surface of the oven floor and used to provide an electrical signal to an oven temperature controller that calculates temperature from the signal and allows display of the temperature on the oven, temperature limit settings by the operator and automated switching of relays that open and close to power or actuate a heat source positioned in or under the oven floor that heats the oven floor. The control system may include infrared sensing of more than one surface of the floor at one time. Relays from more than one controller receiving signals from more than one infrared sensor sensing light emissions from more than one surface may be arranged in series or in parallel in the signal line or power line that actuates or powers the heat source that heats the oven floor. These oven floor temperature regulation systems may operate simultaneously with a temperature sensor, usually a thermocouple, that senses the temperature of the hot gas contained in the top of the baking chamber, or surface temperature of the bottom surface of the dome of the oven, and sends a signal to an oven temperature controller used to display temperature, allow process temperature limit settings and actuate a relay that closes to signal or power a dedicated heat source located inside of or under the top of the baking chamber to heat the baking chamber.

The present invention also includes high temperature ovens using one or more infrared sensors located outside of the baking chamber to measure infrared light emitted from the top and or bottom and or side surfaces of the oven floor to provide signals to one or more oven temperature controllers regulating relays arranged alone, in series or in parallel that power at least one independent dedicated underfloor heat source to heat the oven floor. These systems may operate with or without mechanisms for dome temperature sensing, preferably with thermocouples, to provide signals to an adjustable oven temperature controller regulating relays that power at least one dedicated heating element positioned in or under the top of the baking chamber to independently control heating of the baking chamber.

Infrared sensing of light emitted from an oven floor surface may be performed, for example, on areas of the oven floor protruding from the front of the baking chamber, and or through one or more ports or openings in one or more oven structures between the sensor and the oven floor including the physical structure of the boundaries of the baking chamber, insulation and insulation compartments and structure that surrounds or contains them, vents, ducts and other open areas surrounding the baking chamber and the insulation around it, the physical boundaries containing vents and ducts, fixed or moving oven floor support structures, burners, and or any other structures juxtaposed between the floor surface emitting the infrared light sensed by the infrared sensor and the sensor itself. Mechanisms for protecting the sensor from heat may be used including, for example, powered positive or negative air ventilation and or baffles and or shutters in any space between the sensor and the oven floor. Back up battery power supplies to prevent unplanned cessation of ventilation in the event of primary power source failure may also be employed. Ventilation may also be provided between the oven chamber walls and the exterior surface of the oven, and around exhaust fan motors, and light sources.

The present invention also includes systems using negative or positive pressure powered air ventilation to cool the space between the oven exterior surface structure and the walls of the baking chamber, as well as the space between the outside surface structure of the oven door and the inside surface structure of the oven door. This ventilation may be used with or without a contained insulation layer in these spaces, with or without ventilation in the space between the exterior surface structure of the oven and door, and the insulation layer and its containment, with or without ventilation in the space between the insulation layer and its containment and the baking chamber walls and or inside surface of the oven door, or both spaces, on the inside and on the outside of the insulation layer and its containment structure. The insulation layer may be two metal plates with a vacuum between, for example. The present invention also includes light sources for ovens, located outside of the baking chamber and or inside of an oven door, and or in an oven hood, with or without powered ventilation for cooling of the light source, with or without baffles, glass barriers or other mechanical systems to obstruct hot gas from the baking chamber from heating and damaging the light source, with or without shutters that close to provide protection of the light source during power failures, and with or without back up battery power supplies to allow uninterrupted ventilation in the event of a primary power failure. Powered ventilation may also be used to cool and protect exhaust fan motors from overheating.

The present invention includes an apparatus for measuring the temperature of a high temperature oven, kiln or furnace floor and or illuminating it using heat sensitive equipment when the ambient temperature of the desired operating environment exceeds the maximum operating temperature of the equipment.

In various embodiments, the apparatus for measuring the temperature comprises: an infrared sensor and/or visible light source.

In various embodiments, the apparatus for measuring the temperature may also comprise: a bracket or other structural element providing structural support for the sensor and or light source in a location remote from the hot environment, outside of the material structure comprising the inside surface of a baking chamber, furnace combustion chamber or other hot space, and away from hot gas contained in or discharged from the baking chamber, combustion chamber or other hot environment.

In various embodiments of the apparatus for measuring the temperature, there are structural elements, or baffles, arranged interposed between a sensor and or light source and a sensor target and or object of illumination, in a way that allows unobstructed sensing of infrared light emissions from a target surface and or its illumination, and interference with oven, furnace, kiln, or other hot gas emissions impinging on the sensor and or light source.

In various embodiments of the apparatus for measuring the temperature, there may be powered ventilation, preferably by a fan or blower providing positive pressure or vacuum, arranged to provide cool airflow in the space between the sensor and or light source, and the sensing target and or the object of illumination.

In various embodiments of the apparatus for measuring the temperature, a solenoid or other electromagnetic mechanism, or a linear or rotary actuator, or a pneumatic mechanism, or an electric motor, or a mechanism using the vacuum or air pressure generated by an oven exhaust fan, or other mechanical systems, or manual operations is are used alone or in combination to move a shutter or other element that may be interposed or removed from the space between the infrared sensor and the sensing target to allow sensing when the shutter is open, or when closed, protection of the sensor and or a light source from heat damage by obstructing hot oven chamber gas emissions from impinging directly on the sensor and or light source.

The present invention includes an automated oven temperature control system wherein at least one infrared sensor is used to measure the infrared light emissions from at least the top surface of an oven floor to provide signal to at least one means of controlling temperature that allows high and low temperature limit setting and hysteresis cycling by switching at least one relay that provides signal or powers at least one heat source located in or under the oven floor that heats at least the oven floor.

In various embodiments, the oven temperature control system further comprises a second means of measuring temperature, preferably a thermocouple, which measures the temperature of hot gas in the baking chamber or the surface temperature of the top or sides of a structure forming the baking chamber or the temperature of the material structure of a baking chamber and signals a second means of controlling temperature that allows adjustable high and low temperature limit setting and hysteresis cycling by switching a relay that provides signal or powers a second heat source located in or under the top of a baking chamber that heats the baking chamber.

In various embodiments, the oven control system can also have a second means of measuring temperature measures the temperature of hot gas in the baking chamber or the surface temperature of the top or side of the structure forming the baking chamber or the temperature of the material structure of the baking chamber and can signal a second means of controlling temperature that allows adjustable high and low temperature limit setting and hysteresis cycling by switching a relay that provides signal or powers a second heat source located in or under the top of a baking chamber that heats the baking chamber and can also include a third means of sensing temperature, preferably an IR sensor, which senses the infrared light emissions from the bottom surface of an oven floor, or the temperature of hot gas very close to the bottom surface of an oven floor and signals a third means of controlling temperature that allows adjustable high and low temperature limit setting and hysteresis cycling by switching a relay that provides signal or powers a heat source that heats an oven floor and wherein the relays providing signal or power to the heat source heating the oven floor are arranged in series or in parallel with or without switching to select regulation by one or both means of controlling the temperature of the oven floor.

In various embodiments, the oven temperature control system heat sources are one or two burners or electrical resistance heating elements with one or two fuel or electrical current supplies wherein one fuel supply is variable by means of a solenoid gas valve or electrical relay that opens and closes to turn fuel or current supply off and on, and or one fuel or current supply is constant and wherein each fuel supply may or may not be adjustable by means of an in line manual gas valve or variable resistor.

In various embodiments, the oven control system includes one or more oven temperature controller outputs which are variable and proportional to the degree that process temperature deviates from a target temperature setting, providing regulation of one or more variable output heat sources that generate more or less heat depending on the amplitude of an incrementally variable signal from the proportional signal controller.

In various embodiments, the oven control system also includes wherein oven floor top surface sensor temperature data is monitored by a computer system that identifies the introduction of cold pizza into the oven by the abrupt drop in the temperature reading of the top surface of the oven floor caused by the interposition of cold pizza between the sensor and the floor, and triggers a computerized burner heat output algorithm that varies temperature over time on multiple monitored surfaces, in a programmed bake cycle, with our without monitoring of pizza surface temperature and other sensor input to end the bake cycle or change heat supply over time to optimize the characteristics of the baking cycle and minimize time to target temperature in an empty oven after a baking cycle.

The present invention includes a high temperature oven first set of embodiments. In the high temperature oven first set of embodiments, the oven comprises: at least 3 oven walls, two on the sides and one in the rear, a top or dome positioned above the walls, an oven floor that is circular and located in-between the oven side walls and in front of the oven rear wall that rotates freely about a central vertical axis and at least one means of measuring temperature is a first means of measuring temperature that is an infrared sensor that measures infrared light emissions from the top or side surface of an oven floor and provides a signal to at least one means of controlling temperature that is a first means of controlling temperature that allows switching of a relay, high and low temperature limit setting and hysteresis cycling that regulates a control signal or power supply to at least one of one means of heating that is a first heat source that heats at least the bottom surface of the oven floor, wherein a baking chamber is formed by the inside surfaces of the oven walls, the bottom surface of the dome, the opening in the front of the oven formed by the front edges of the dome and the front edges of the side walls, and the top surface of the oven floor and wherein the infrared sensor that is the first means of measuring temperature is located outside of the baking chamber and the structural elements that immediately contain it, and wherein the oven floor may or may not protrude from the baking chamber and wherein the first heat source may be fixed under the oven floor or movable from a position directly under the oven floor to positions that are adjustable and partly under the oven floor and partly under the dome or baking chamber.

In various embodiments of the first set of embodiments, the high temperature oven further comprises a second means of measuring temperature, preferably a thermocouple, that measures the temperature of hot gas in the baking chamber or the surface temperature of the top or sides of the structure forming the baking chamber, or the temperature of the material structure of the baking chamber, to provide a signal to a second means of controlling temperature that allows switching of a relay, high and low temperature limit setting and hysteresis cycling to regulate a control signal or power supply to a second heat source that heats at least the baking chamber from a position inside the dome or underneath it.

In various embodiments of the first set of embodiments, the oven may further comprise a second means of measuring temperature, preferably a thermocouple, that measures the temperature of hot gas in the baking chamber or the surface temperature of the top or sides of the structure forming the baking chamber, or the temperature of the material structure of the baking chamber, that provides a signal to a second means of controlling temperature that allows switching of a relay, high and low temperature limit setting and hysteresis cycling to provide a control signal or power supply to a second heat source that heats at least the baking chamber from a position inside of the dome or underneath it, and a third means of measuring temperature, that is an infrared sensor that measures infrared light emissions from the bottom surface of the oven floor and provides a signal to a third means of controlling temperature that allows switching of a relay, high and low temperature limit setting and hysteresis cycling to regulate a control signal or power supply for the first heat source located under the oven floor that heats at least the oven floor, wherein, the relays controlled by the first and third means of controlling temperature are arranged in series or in parallel in the control signal or power supply line for the heat source positioned under the oven floor to heat the oven floor and wherein if the relays are arranged in parallel, switching may or may not be provided so that the operator may select the first, the third, or simultaneous operation of both means of controlling temperature for regulation of the heat source that heats the oven floor.

In various embodiments of the first set of embodiments of the oven, the means of heating are heat sources comprising one or two burners or electrical resistance heating elements with one or two fuel or electrical current supplies wherein one fuel or current supply is variable by means of a solenoid gas valve or electrical relay regulated by a controller that opens and closes to turn fuel or current supply off and on, and or one fuel or current supply is constant and wherein each fuel or current supply may or may not be adjustable by means of an in line manual gas valve or manually adjustable variable resistor.

In various embodiments of the first set of embodiments of the oven, the oven may further comprise an underfloor chamber or area under the oven floor that may be fixed, or rotating with the oven floor, attached to the oven floor or the structure that supports it, or unattached; bounded at the top by the bottom surface of the oven floor, bounded at the sides by structural perimeter walls, open at the bottom, or structurally connected to the flat bottom structure supporting the burners in the area under the oven floor, or constructed as two parts, a bottom part that is fixed to the bottom surface of the burner box or other structure and a top part that is attached to the oven floor and rotating with it, wherein the first heat source is contained inside of or located under the underfloor chamber, and wherein discharge of hot gas heating the bottom surface of the oven floor and accumulating inside of the underfloor chamber is discharged from the underfloor chamber, into the baking chamber, the external environment, or oven ventilation system, or combination thereof, in a way that may or may not allow selection of the destination of the exhaust gas in total or in part.

Various embodiments of the first set of embodiments of the oven may further comprise a vent structure comprising four walls and a top, that may or may not protrude beyond the plane of the front of the baking chamber, with or without insulation around the vent walls bounded by containment structure, forming a vent, positioned over the baking chamber and overlying insulation, over the top of the structure of the exterior surfaces of the sides of the oven, wherein the vent is open at the bottom to receive hot exhaust gas rising from the front of the baking chamber, and circulating air from a ventilation space located between the baking chamber walls and the material structure of the exterior surface of the oven, inside of or outside of an insulation layer between the oven walls and exterior surface of the oven; open at the top to allow a fan, impeller, turbine or blower to cause a negative pressure in the top of the vent and positive pressure in the flue or exhaust duct that ports exhaust gas to the external environment; and open at the top or sides for a port(s) or other opening(s) to allow infrared light emanating from the oven floor, directly or through a port or opening in the oven dome and or the top sides or bottom of the vent to impinge on an infrared sensor located above or beside the vent, and light for illumination to shine on the oven floor from a light source located above the vent, through the vent, top sides and or bottom and wherein the sensor sensing infrared light emissions from the top of the oven floor and light source illuminating the oven floor are defended from hot exhaust gas rising through the port by the remote location of the sensor and light source relative to the baking chamber, and or the vent, powered ventilation, shutters, and or backup power supplies for the powered ventilation defending the sensor and light source, and wherein the vent structure may or may not support lighting and artwork positioned above the vent to decorate the oven.

Various embodiments of the first set of embodiments of the oven may further comprise a blower or fan that maintains negative pressure in a vent or positive pressure in a flue causing air movement, a sheet metal flap mounted on a hinge in the vent or flue that is movable by positive or negative air pressure generated by airflow in the vent or flue, at least 4 plates, a top plate, a bottom plate and 2 side plates, joined to form a chamber, open on one end to the vent containing exhaust gas under negative pressure and open on the other end to the cool air in the external environment, an infrared sensor mounted in the top of the chamber, a port or opening in the bottom of the chamber, under the infrared sensor, that opens to an oven floor below, a movable shutter or door, normally closed, positioned inside the chamber, over the port, between the oven floor and the sensor, a linkage or mechanical connection between the flap in the vent or flue and the shutter in the chamber wherein negative pressure in the vent causes negative pressure in the chamber and movement of cool air from the external environment into the chamber and the space between the sensor and the port, and wherein, movement of air in the vent or flue causes movement of the flap contained therein, by pulling or pushing the linkage, or otherwise actuating movement of the shutter from a closed position which protects the sensor from hot gas rising through the port to damage the sensor to an open position that allows infrared light from the oven floor to impinge on the sensor while there is ventilation in the space between the sensor and the port, with or without mechanical actuation by similar means of a door between the chamber and the vent with or without mechanical actuation by similar means of a relay that closes to provide signal verifying exhaust ventilation to an ignition module.

Various embodiments of the first set of embodiments of the oven further comprise an oven door with and without contained insulation, bounded at the top by the plane of the top surface of the oven floor, below the opening to the baking chamber, and on the sides by the outside confines of the insulation layer on the sides of the baking chamber, preferably supported by hinges and equipped with a latch with or without a space arranged between the bounding structure of the insulation layer and the outside surface structure of the oven door, and or the inside surface structure of the oven door, with or without provision for positive or negative pressure powered air ventilation inside the spaces in the door with or without a light source located inside of the door, that may or may not be protected by insulation and ventilation, that provides illumination through the door, with or without illumination of a reflective surface at the top of the door directing light into the baking chamber.

In various embodiments of the first set of embodiments of the oven, insulation is provided by a structure(s) that form(s) a closed space containing a vacuum.

In various embodiments of the first set of embodiments of the oven of the present invention, the drive mechanism that causes rotation of the oven floor and the structure that supports it about a vertical axis is a solid axle, or a hollow axle open at its center to convey fuel or electrical power to a heat source located inside of or under the rotating oven floor, or a hollow drum structure oriented on vertical axis, open at the top and bottom, supporting the oven floor at its top edge, and rotating on a perimeter bearing system or Lazy Susan bearing, on the bottom of its structure, allowing sensing and heat source equipment to be maintained on or in a stationary platform positioned at the center of, inside of the rotating perimeter drum structure. The present invention also includes a wall and oven door ventilation system comprising: a structure forming interior walls around a baking chamber or combustion chamber of an oven kiln or furnace; a structure forming an exterior surface of an oven, kiln, or furnace; an insulation layer bounded by a containment structure located between the interior walls and the exterior surface structure of the oven kiln or furnace; wherein the above elements are positioned such that an open space is formed between the outside surface structure of the oven kiln or furnace and the contained insulation layer and or an open space is formed between the inside walls surrounding the baking chamber and the contained insulation layer, wherein the space(s) are open at the bottom to the external environment of the oven, and open at the top to an area under or inside of a vent, containing negative pressure or vacuum that causes airflow from the external environment to flow from the external environment into the space(s) inside the oven walls, around the insulation layer, and then from the spaces inside the walls to an area under the vent or inside of the vent for exhaust discharge, with or without an oven door constructed with a space between the outside surface structure of the oven door and the interior surface structure of the oven door, with or without a contained insulation layer located between the inside and outside surfaces of the door such that an open space(s) is are arranged between the contained insulation layer and the inside and or outside surfaces of the oven door, wherein the space(s) is are open to receive cool air from the ambient environment at the bottom of the door and expel hot air from the interior spaces in the door at the top of the door, and preferably into a hood vent above, and wherein powered ventilation provides a positive or negative pressure in the spaces in the door causing airflow in the door to cool it, with or without a ventilated light source located inside the ventilated space inside the oven door and with or without a reflective surface on which light shines to illuminate the oven chamber.

The present invention also includes a light source located inside of an oven door or shaft, outside of a baking chamber and or under it, with or without ventilation in a space containing it, or a space between the baking chamber and the light source, wherein light shines up through a shaft or space between the outside surface structure of the door and an inside surface of the door and or the outside surface of the structure containing an insulation layer inside the door, such that the food in the oven chamber is illuminated directly or by light reflecting off of structures at the top of the door or light shaft and onto the food in the baking chamber.

The present invention also includes a ventilated light source wherein a light source positioned outside of an oven baking chamber is cooled by powered ventilation and or defended by shutters interposed between the light source and hot gas produced by the oven such that light can be provided from a position to illuminate the baking chamber that would otherwise be in an environment that would cause heat damage to the light source.

The present invention also includes a second set of high temperature oven embodiments. In the second set of embodiments, the oven comprises: at least 3 oven walls, two on the sides and one in the rear, a top or dome positioned above the walls, an oven floor that is circular and located in-between the oven side walls and in front of the oven rear wall that rotates freely about a central vertical axis and at least one means of measuring temperature is a first means of measuring temperature that is an infrared sensor that measures infrared light emissions from the top or side surface of an oven floor and provides a signal to at least one means of controlling temperature that is a first means of controlling temperature that allows switching of a relay, high and low temperature limit setting and hysteresis cycling that regulates a control signal or power supply to at least one of one means of heating that is a first heat source that heats at least the bottom surface of the oven floor, wherein a baking chamber is formed by the inside surfaces of the oven walls, the bottom surface of the dome, the opening in the front of the oven formed by the front edges of the dome and the front edges of the side walls, and the top surface of the oven floor and wherein the infrared sensor that is the first means of measuring temperature is located outside of the baking chamber and the structural elements that immediately contain it, and wherein the oven floor may or may not protrude from the baking chamber and wherein the first heat source may be fixed under the oven floor or movable from a position directly under the oven floor to positions that are adjustable and partly under the oven floor and partly under the dome or baking chamber.

Various embodiments of the second set of high temperature oven embodiments further comprise a second means of measuring temperature, preferably a thermocouple, that measures the temperature of hot gas in the baking chamber or the surface temperature of the top or sides of the structure forming the baking chamber, or the temperature of the material structure of the baking chamber, to provide a signal to a second means of controlling temperature that allows switching of a relay, high and low temperature limit setting and hysteresis cycling to regulate a control signal or power supply to a second heat source that heats at least the baking chamber from a position inside the dome or underneath it.

Various embodiments of the second set of oven embodiments may further comprise a second means of measuring temperature, preferably a thermocouple, that measures the temperature of hot gas in the baking chamber or the surface temperature of the top or sides of the structure forming the baking chamber, or the temperature of the material structure of the baking chamber, that provides a signal to a second means of controlling temperature that allows switching of a relay, high and low temperature limit setting and hysteresis cycling to provide a control signal or power supply to a second heat source that heats at least the baking chamber from a position inside of the dome or underneath it, and a third means of measuring temperature, that is an infrared sensor that measures infrared light emissions from the bottom surface of the oven floor and provides a signal to a third means of controlling temperature that allows switching of a relay, high and low temperature limit setting and hysteresis cycling to regulate a control signal or power supply for the first heat source located under the oven floor that heats at least the oven floor, wherein, the relays controlled by the first and third means of controlling temperature are arranged in series or in parallel in the control signal or power supply line for the heat source positioned under the oven floor to heat the oven floor and wherein if the relays are arranged in parallel, switching may or may not be provided so that the operator may select the first, the third, or simultaneous operation of both means of controlling temperature for regulation of the heat source that heats the oven floor.

In various embodiments of the second set of oven embodiments, the means of heating are heat sources comprising one or two burners or electrical resistance heating elements with one or two fuel or electrical current supplies wherein one fuel or current supply is variable by means of a solenoid gas valve or electrical relay regulated by a controller that opens and closes to turn fuel or current supply off and on, and or one fuel or current supply is constant and wherein each fuel or current supply may or may not be adjustable by means of an in line manual gas valve or manually adjustable variable resistor.

In various embodiments of the second set of oven embodiments, one or more oven temperature controller outputs is are variable and proportional to the degree that process temperature deviates from a target temperature setting, providing regulation of one or more variable output heat sources that generate more or less heat depending on the amplitude of an incrementally variable signal from the proportional signal controller.

In various embodiments of the second set of oven embodiments, the oven floor top surface sensor temperature data is monitored by a computer system that identifies the introduction of cold pizza into the oven by the abrupt drop in the temperature reading of the top surface of the oven floor caused by the interposition of cold pizza between the sensor and the floor, and triggers a computerized burner heat output algorithm that varies temperature over time on multiple monitored surfaces, in a programmed bake cycle, with our without monitoring of pizza surface temperature and other sensor input to end the bake cycle or change heat supply over time to optimize the characteristics of the baking cycle and minimize time to target temperature in an empty oven after a baking cycle.

In various embodiments of the second set of oven embodiments, the oven further includes a bracket or other structural element providing structural support for a sensor and or light source in a location remote from the hot environment, outside of the material structure comprising the inside surface of a baking chamber, furnace combustion chamber or other hot space, and away from hot gas contained in or discharged from the baking chamber, combustion chamber or other hot environment.

In various embodiments of the second set of oven embodiments, structural elements, or baffles, are arranged interposed between a sensor and or light source and a sensor target and or object of illumination, in a way that allows unobstructed sensing of infrared light emissions from a target surface and or its illumination, and interference with oven, furnace, kiln, or other hot gas emissions impinging on the sensor and or light source.

In various embodiments of the second set of oven embodiments, powered ventilation, preferably by a fan or blower providing positive pressure or vacuum is arranged to provide cool airflow in the space between the sensor and or light source, and the sensing target and or the object of illumination.

In various embodiments of the second set of oven embodiments, a solenoid or other electromagnetic mechanism, or a linear or rotary actuator, or a pneumatic mechanism, or an electric motor, or a mechanism using the vacuum or air pressure generated by an oven exhaust fan, or other mechanical systems, or manual operations is are used alone or in combination to move a shutter or other element that may be interposed or removed from the space between the infrared sensor and the sensing target to allow sensing when the shutter is open, or when closed, protection of the sensor and or a light source from heat damage by obstructing hot oven chamber gas emissions from impinging directly on the sensor and or light source.

In various embodiments of the second set of oven embodiments further comprises an underfloor chamber or area under the oven floor that may be fixed, or rotating with the oven floor, attached to the oven floor or the structure that supports it, or unattached; bounded at the top by the bottom surface of the oven floor, bounded at the sides by structural perimeter walls, open at the bottom, or structurally connected to the flat bottom structure supporting the burners in the area under the oven floor, or constructed as two parts, a bottom part that is fixed to the bottom surface of the burner box or other structure and a top part that is attached to the oven floor and rotating with it, wherein the first heat source is contained inside of or located under the underfloor chamber, and wherein discharge of hot gas heating the bottom surface of the oven floor and accumulating inside of the underfloor chamber is discharged from the underfloor chamber, into the baking chamber, the external environment, or oven ventilation system, or combination thereof, in a way that may or may not allow selection of the destination of the exhaust gas in total or in part.

In various embodiments of the second set of oven embodiments, the oven may further comprise a vent structure comprising four walls and a top, that may or may not protrude beyond the plane of the front of the baking chamber, with or without insulation around the vent walls bounded by containment structure, forming a vent, positioned over the baking chamber and overlying insulation, over the top of the structure of the exterior surfaces of the sides of the oven, wherein the vent is open at the bottom to receive hot exhaust gas rising from the front of the baking chamber, and circulating air from a ventilation space located between the baking chamber walls and the material structure of the exterior surface of the oven, inside of or outside of an insulation layer between the oven walls and exterior surface of the oven; open at the top to allow a fan, impeller, turbine or blower to cause a negative pressure in the top of the vent and positive pressure in the flue or exhaust duct that ports exhaust gas to the external environment; and open at the top for a port(s)or other opening(s) to allow infrared light emanating from the oven floor, directly or through a port or opening in the oven dome, to impinge on an infrared sensor located above the vent, and light for illumination to shine on the oven floor from a light source located above the vent, and wherein the sensor sensing infrared light emissions from the top of the oven floor and light source illuminating the oven floor are defended from hot exhaust gas rising through the port by the remote location of the sensor and light source relative to the baking chamber, powered ventilation, shutters, and or backup power supplies for the powered ventilation defending the sensor and light source, and wherein the vent structure may or may not support lighting and artwork positioned above the vent to decorate the oven.

In various embodiments of the second set of oven embodiments, the oven may further comprise a blower or fan that maintains negative pressure in a vent or positive pressure in a flue causing air movement a sheet metal flap mounted on a hinge in the vent or flue that is movable by positive or negative air pressure generated by airflow in the vent or flue, at least 4 plates, a top plate, a bottom plate and 2 side plates, joined to form a chamber, open on one end to the vent containing exhaust gas under negative pressure and open on the other end to the cool air in the external environment, an infrared sensor mounted in the top of the chamber, a port or opening in the bottom of the chamber, under the infrared sensor, that opens to an oven floor below, a movable shutter or door, normally closed, positioned inside the chamber, over the port, between the oven floor and the sensor, a linkage or mechanical connection between the flap in the vent or flue and the shutter in the chamber wherein negative pressure in the vent causes negative pressure in the chamber and movement of cool air from the external environment into the chamber and the space between the sensor and the port, and wherein, movement of air in the vent or flue causes movement of the flap contained therein, by pulling or pushing the linkage, or otherwise actuating movement of the shutter from a closed position which protects the sensor from hot gas rising through the port to damage the sensor to an open position that allows infrared light from the oven floor to impinge on the sensor while there is ventilation in the space between the sensor and the port, with or without mechanical actuation by similar means of a door between the chamber and the vent with or without mechanical actuation by similar means of a relay that closes to provide signal verifying exhaust ventilation to an ignition module.

In various embodiments of the second set of oven embodiments, the oven further comprises an oven door with and without contained insulation, bounded at the top by the plane of the top surface of the oven floor, below the opening to the baking chamber, and on the sides by the outside confines of the insulation layer on the sides of the baking chamber, preferably supported by hinges and equipped with a latch with or without a space arranged between the bounding structure of the insulation layer and the outside surface structure of the oven door, and or the inside surface structure of the oven door, with or without provision for positive or negative pressure powered air ventilation inside the spaces in the door with or without a light source located inside of the door, that may or may not be protected by insulation and ventilation, that provides illumination through the door, with or without illumination of a reflective surface at the top of the door directing light into the baking chamber.

In various embodiments of the second set of oven embodiments, insulation is provided by a structure(s) that form(s) a closed space containing a vacuum.

In various embodiments of the second set of oven embodiments, the drive mechanism that causes rotation of the oven floor and the structure that supports it about a vertical axis is a solid axle, or a hollow axle open at its center to convey fuel or electrical power to a heat source located inside of or under the rotating oven floor, or a hollow drum structure oriented on vertical axis, open at the top and bottom, supporting the oven floor at its top edge, and rotating on a perimeter bearing system on the bottom of its structure, allowing sensing and heat source equipment to be maintained inside of the drum.

In various embodiments of the second set of oven embodiments, the oven walls and oven door are ventilated by a ventilation system comprising a structure forming interior walls around a baking chamber or combustion chamber of an oven kiln or furnace a structure forming an exterior surface of an oven, kiln, or furnace an insulation layer bounded by containment structure located between the interior surface walls and the exterior surface structure of the oven kiln or furnace wherein the above elements are positioned such that an open space is formed between the outside surface structure of the oven kiln or furnace and the contained insulation layer and or an open space is formed between the inside walls surrounding the baking chamber and the contained insulation layer, wherein the space(s) are open at the bottom to the external environment of the oven, and open at the top to an area under or inside of a vent, containing negative pressure or vacuum that causes airflow from the external environment to flow from the external environment into the space(s) inside the oven walls, around the insulation layer, and then from the spaces inside the walls to an area under the vent or inside of the vent for exhaust discharge, with or without an oven door constructed with a space between the outside surface structure of the oven door and the interior surface structure of the oven door, with or without a contained insulation layer located between the inside and outside surfaces of the door such that an open space(s) is are arranged between the contained insulation layer and the inside and or outside surfaces of the oven door, wherein the space(s) is are open to receive cool air from the ambient environment at the bottom of the door and expel hot air from the interior spaces in the door at the top of the door, and preferably into a hood vent above, and wherein powered ventilation provides a positive or negative pressure in the spaces in the door causing airflow in the door to cool it, with or without a ventilated light source located inside the ventilated space inside the oven door and with or without a reflective surface on which light shines to illuminate the oven chamber.

In various embodiments of the second set of oven embodiments, a light source is located inside of an oven door or shaft, outside of a baking chamber and or under it, with or without ventilation in a space containing it, or a space between the baking chamber and the light source, wherein light shines up through a shaft or space between the outside surface structure of the door and an inside surface of the door and or the outside surface of the structure containing an insulation layer inside the door, such that the food in the oven chamber is illuminated directly or by light reflecting off of structures at the top of the door or light shaft and onto the food in the baking chamber.

Various embodiments of the second set of oven embodiments further comprise: a ventilated light source wherein a light source positioned outside of an oven baking chamber is cooled by powered ventilation and or defended by shutters interposed between the light source and hot gas produced by the oven such that light can be provided from a position to illuminate the baking chamber that would otherwise be in an environment that would cause heat damage to the light source.

The present invention also includes a third set of oven embodiments. In the third set of embodiments, the high temperature oven comprises: a baking chamber; an oven floor; a first heating element; a second heating element; a first control system; a second control system; wherein the first control system controls the first heating element; wherein the first control system comprises an infrared sensor, an oven floor temperature controller, an oven floor temperature control relay, and a solenoid valve; wherein the second control system controls the second heating element; wherein the second control system comprises a thermocouple, a baking chamber temperature controller, a baking chamber temperature control relay, and a solenoid valve; wherein the oven floor has a top and bottom surface; wherein the first heating element is positioned underneath the bottom surface of the oven floor; wherein the infrared sensor measures the temperature of the top surface of the oven floor; wherein the first control system ramps the first heating element when the temperatures measured by the infrared sensor is below a high temperature limit set in the oven floor temperature controller; wherein the thermocouple measures the temperature of the baking chamber; wherein the second heating element is not located directly underneath the oven floor and is located underneath the top of the baking chamber; and wherein the second control system ramps the second heating element when the temperature measured by the thermocouple is below a high temperature limit set in the baking chamber temperature controller.

The present invention also includes a system for measuring the temperature of a high temperature oven floor, comprising: an infrared sensor; a bracket; and a high temperature oven, the high temperature oven comprising an oven floor, a baking chamber, and an insulation layer; wherein the baking chamber has an opening in the front of the baking chamber; wherein the insulation layer is above the top of the baking chamber; wherein the bracket is attached to the insulation layer, the infrared sensor is attached to the bracket so as to be located outside of and above the baking chamber and above the top surface of the oven floor, and the infrared sensor measures infrared light emissions from the oven floor.

In various embodiments of the system, the system further includes one or more baffles positioned between the open front of the high temperature oven baking chamber and the infrared sensor.

The present invention also includes a fourth set of oven embodiments. In the fourth set of oven embodiments, the oven comprises: an infrared sensor; an oven floor having a top and bottom surface; an oven floor top surface temperature controller; an oven floor top surface temperature controller relay; a baking chamber; an insulation layer; one or more heating elements; and a bracket; wherein the baking chamber comprises a top and a front opening; wherein the insulation layer is positioned on top of the top of the baking chamber; wherein at least one of the one or more heating elements is located underneath the oven floor;

wherein the infrared sensor is attached to the bracket so as to be located outside of and above the baking chamber and above the top surface of the oven floor; and wherein the infrared sensor measures the temperature of the top of the oven floor, sends a signal to the oven floor top surface temperature controller which then displays the measured temperature and provides relay switching to power or control signals to one or more of the heating elements to change the temperature of the oven floor.

In various embodiments of the fourth set of oven embodiments, the oven further comprises one or more baffles positioned between the front opening of the high temperature oven baking chamber and the infrared sensor.

In various embodiments of the fourth set of oven embodiments, the bracket is attached to the oven.

In various embodiments of the fourth set of oven embodiments, the bracket is not attached to the oven.

The present invention also includes a system for regulating the temperature of an oven floor utilizing the apparatuses mentioned herein.

In various embodiments of the fourth set of oven embodiments, the oven comprises two heating elements, wherein one of the heating elements is controlled by the top surface temperature controller.

In various embodiments of the fourth set of oven embodiments, one of the heating elements is not controlled by the top surface temperature controller and is a soak heating element.

In various embodiments of the fourth set of oven embodiments, the oven comprises a common fuel supply line and at least two fuel supply lines, each of the two fuel supply lines having a manual valve, a solenoid gas valve controlled by the oven floor top surface temperature controller, wherein the solenoid gas valve can be in an opened or closed position, wherein the solenoid gas valve is closed but opens when powered by the oven floor top surface temperature controller relay, allowing gas from one of the fuel supply lines to flow to the common fuel line for ramping of the oven; and wherein a second fuel supply line provides a constant fuel flow to the one or more heating elements.

In various embodiments of the fourth set of oven embodiments, the oven further comprises a second heating element which is positioned away from the oven floor and underneath the baking chamber; a thermocouple; a baking chamber temperature controller; a baking chamber temperature controller relay; and a second solenoid valve; wherein the thermocouple is positioned in the top of the baking chamber; wherein the thermocouple signals to the baking chamber temperature controller; wherein the baking chamber temperature controller operates the baking chamber temperature relay; wherein the relay closes when the temperature measured by the thermocouple is below a set temperature set in the baking chamber temperature controller, thus opening the second solenoid valve, providing gas to the second heating element until the temperature measured by the thermocouple is at or above the set temperature.

In various embodiments of the present invention, the oven further comprises a fan, wherein the baking chamber further comprises a port that traverses the insulation layer and top of the baking chamber; wherein the infrared sensor is positioned above the port so as to sense through the port; wherein the fan is positioned so as to protect the infrared sensor from hot air or gasses rising through the port from the baking chamber.

In various embodiments of the present invention, the oven comprises a shutter and a solenoid actuator for the shutter; wherein the shutter, when in a closed position, is positioned directly above the port, between the infrared sensor and baking chamber; wherein the shutter is opened by the solenoid actuator during operation of the oven; and wherein, in the event of a power failure to the fan, the solenoid actuator will also lose power, causing the shutter to close, thus protecting the infrared sensor from heat damage.

Included in the present invention is a fifth set of embodiments of a high temperature oven. In the fifth set of embodiments, the oven comprises: a baking chamber; an oven floor; a first heating element; a second heating element; a first control system; a second control system; wherein the first control system controls the first heating element; wherein the first control system comprises a first and a second oven floor infrared sensor, a first and a second oven floor temperature controller, a first and a second oven floor temperature control relay, and a solenoid valve; wherein the second control system controls the second heating element; wherein the second control system comprises a thermocouple, a baking chamber temperature controller, a baking chamber temperature control relay, and a solenoid valve; wherein the oven floor has a top surface and a bottom surface; wherein the first heating element is positioned underneath the bottom surface of the oven floor; wherein the first infrared sensor measures the temperature of the top surface of the oven floor; wherein the second infrared sensor measures the temperature of the bottom surface of the oven floor; wherein the first control system ramps the first heating element when the temperatures measured by the first infrared sensor and second infrared sensor are below a high temperature limit set in the first oven floor temperature controller and a high temperature limit set in the second oven floor temperature controller; wherein the thermocouple measures the temperature of the baking chamber; wherein the second heating element is not located directly underneath the oven floor and is located underneath the top of the baking chamber; and wherein the second control system ramps the second heating element when the temperature measured by the thermocouple is below a high temperature limit set in the baking chamber temperature controller.

Various embodiments of the present invention include an oven which comprises a fan and an insulation layer; wherein the insulation layer surrounds the baking chamber; wherein the baking chamber further comprises a port that traverses the insulation layer and top of the baking chamber; wherein the infrared sensor is positioned above the port so as to sense through the port; wherein the fan is positioned so as to protect the infrared sensor from hot air or gasses rising through the port from the baking chamber.

Various embodiments of the present invention include an oven which comprises an insulation layer; wherein the insulation layer surrounds the baking chamber; wherein the first infrared sensor is positioned above the baking chamber; wherein the baking chamber further comprises a first port that traverses the insulation layer and top of the baking chamber and a second port that traverses the insulation layer and bottom of the baking chamber; wherein the first infrared sensor is positioned above the baking chamber so that it measures the temperature of the top of the oven floor through the first port; and wherein the second infrared sensor is positioned below the baking chamber so that it measures the temperature of the bottom of the oven floor through the second port.

In various embodiments of the present invention, there are one or more light sources.

In various embodiments of the present invention, one or more light sources include a first light source positioned above the baking chamber and illuminating the baking chamber and a second light source positioned outside of and below the baking chamber, which also illuminates the baking chamber.

In various embodiments of the present invention, the oven lacks an underfloor chamber.

The oven of various embodiments may be portable.

The oven of various embodiments may be sized so as to accommodate multiple pizzas at a time.

The oven of various embodiments may include an oven floor which rotates.

The oven of various embodiments may be sized to bake round pizzas 6-30 inches in diameter.

The oven floor of various embodiments may have a surface area of 21-100 square inches and is 7-32 inches wide.

The present invention also includes the oven control system utilized in any embodiment.

The various features of the various embodiments are not limited to the aforementioned combinations, but can be combined in any way as long as they maintain the essence of the various novel developments disclosed in the present inventions. The various described embodiments are presented as examples and are not meant to limit additional or alternative combinations.

General Background of the Invention

An apparatus to independently control the temperature of the floor and the baking chamber of an oven may have been proposed first by Ricc(U.S. Pat. No. 5,605,092), but no infrared sensor was used in any location. Oven floor surface temperatures, top or bottom, were not measured or controlled. The mechanical fixed location of a thermocouple under baking tiles, over an insulation layer would limit the utility of the system to ovens with fixed floors. Unlike Riccio, the present invention would work with both fixed and moving oven floors. The Riccio oven floor was also heated principally from the top, in a conventional fashion, by a heat source located in the oven chamber, and though Riccio did arrange a "supplemental" heat source under the oven floor and claim to heat the oven floor from the bottom, the underfloor heat source was located outside of and under an insulation layer, of substantial thickness, juxtaposed between the heat source and the bottom surface of the oven floor tiles. The utility of the second heat source for heating the bottom surface of the baking tiles seems quite limited, if functional at all. The Riccio design is very different from various embodiments of the present invention, in which the major heat source is preferably directly in or under the oven floor with preferably no insulation layer juxtaposed between the heat source and the oven floor. That is, in one or more preferred embodiments, direct heating of the bottom surface of the oven floor by a "major" oven heat source is described. The various embodiments of the present invention also differ from Riccio in additional ways, as will be apparent from the descriptions herein.

Minidis (U.S. Pat. No. 6,745,758 B1) describes an oven very much like the current invention in certain respects. There are burners that appear to be located both directly under the floor of the oven and directly under the dome of the oven, and IR sensors are used to sense the temperature of the top surface of a rotating refractory floor. Mindis teaches: "infrared sensors 26 may be located in the cavity dome 13 to sense temperature in the rotating cooking surface or floor 50. The infrared sensor 26 may be located in the forward portion of the cavity dome 13 where the cooking temperature may be relatively cooler due to the access opening 14. There may also be a dome infrared sensor 28 positioned inside 19 to sense the temperature of the cavity dome 13. There may be a controller (not shown) connected to the sensors and to a control panel 22. The control panel may include graphic indicators depicting the actions and steps for oven start-up, set conditions, emergency shut down, and cleaning modes of operation. The controller may compare the sensors 26, 28 to an optimal baking temperature to control the heating of the rear heating element 106 and the infrared heating elements 100. The sensors may be set to automatically adjust infrared heating elements 100 to maintain a baking temperature condition under varying baking requirements."

In Minidis, the infrared sensor 26 is embedded in the refractory dome of the oven made of "stones" 32 (see FIG. 2).

Minidis is vague about the control system, and how it operates, and fails to exactly suggest independent regulation of the floor heating element using a floor sensor and controller, and independent regulation of an independent dome heating element, using a dome sensor and controller. More important, as of the writing of this patent, there are no commercially available infrared sensors that can operate at the 900-degree dome temperature required for Italian Pizza. If the IR sensor measuring infrared light emitted from the floor of the oven is embedded in the dome of the Minidis oven, a high temperature pizza oven could not have been described as of the date of the patent application. Operation temperatures for the Minidis oven were not specified in the text. Six hundred degrees would be the top operating temperature of this oven with the sensor technology available in the market as of the date of the Minidis application, as drawn by Minidis, even with water or air jackets around the infrared sensor to cool it. Minidis could not operate at the high temperatures required for Italian Pizza.

The present invention follows the earlier work of the present inventor, (U.S. Pat. No. 10,624,353, incorporated herein by reference) which describes, inter alia, an oven with an IR sensor positioned in a cool location outside of the baking chamber. The following description and reference to U.S. Pat. No. 10,624,353 is for illustrative purposes only and in no way seeks to limit the scope of U.S. Pat. No. 10,624,353 or any patent application which is related to U.S. Pat. No. 10,624,353, including but not limited to U.S. patent application Ser. No. 16/815,490 (all which are incorporated herein by reference), as the aforementioned patent and patent applications are limited only by the language set forth therein. In various embodiments, the sensor in U.S. Pat. No. 10,624,353 is positioned so that it receives exposure to infrared light emitted from the surface of a rotating oven floor through a port or opening in the structural confines of the oven chamber. In various embodiments, the sensing the infrared light emitted from the bottom surface of the rotating oven floor was accomplished through a port in the bottom of the exterior structure of the oven under the bottom surface of the oven floor. In this way, infrared sensor signal was provided to an oven temperature controller operating a relay that powered a heat source dedicated to heating the bottom surface of the oven floor. Independent regulation of the temperature of the dome was described using a thermocouple to sense the temperature of the air just under the bottom surface of the oven dome to provide signal to an oven temperature controller operating a relay powering a dedicated second heat source located under the dome to heat it.

In an embodiment of U.S. Pat. No. 10,624,353, the method of control was limited to a small rotating oven floor, sensing of the bottom surface of the oven floor, and the use of an underfloor chamber to receive hot gas from a heat source located in or under the underfloor chamber, and to segregate heating of the bottom surface of the oven floor from heating of the oven chamber. Since the filing of that application, it has been discovered that the control system detailed in the prior art may also work with larger ovens and without an underfloor chamber. Application of this technology without limitations related to the size of the oven floor and the presence of an underfloor chamber are sought.

Extensive testing of certain prototypes from U.S. Pat. No. 10,624,353 revealed that though the oven maintains a stable baking environment in the chamber, floor temperature falls dramatically during the baking cycle. After a pizza has been removed from the oven, the top surface temperature of the oven floor requires time to recover to target temperature between baking cycles. Though some of the heating of the oven floor is done by hot gas in the baking chamber heating the top of the floor, the oven floor of the instant art is principally heated from the bottom by the underfloor burner. After a pizza is removed from the oven, the difference between the temperatures of the top surface of the oven floor and the sensed, controlled and heated bottom surface becomes smaller as heat diffuses from the bottom of the floor to the top of the floor just cooled by cold dough during the last bake cycle, until the top floor temperature returns to target temperature for the next baking cycle. The bottom surface of the floor may be at target temperature, causing the floor heat source to be switched off, interrupting heating, even if the top floor surface is under temperature. A handheld infrared sensor can be used to determine when the heat diffusion process is substantially complete and the baking surface has returned to target temperature, ready to receive the next pizza.

It is discovered that the use of a handheld infrared sensor is less than an optimal process. It is an extra piece of equipment that can wind up in dirty environments like pants pockets. Handheld IR sensors must be cleaned. They must be tracked. They get lost. The batteries lose power. The monitoring is intermittent, not continuous. Monitoring does not allow automated regulation of a heating element.

In modern pizza baking, the baking surface temperature is the most monitored parameter because repeated baking cycles cause the most frequently used baking positions on oven floors to cool off. Pizza chefs will use a handheld IR sensor to find a hot spot to place the pizza on the floor of a big oven while uncovered cold spots heat up for future baking cycles. In a small oven with a single baking position the chef must wait until the baking surface has returned to target temperature. Baking chamber or dome temperatures are also measured, and they fall when a cold pizza is introduced into the chamber as the process of the floor heating the chamber or sharing heat with the chamber is stopped by the introduction of a pizza between the floor and baking chamber, which acts as a cold insulation layer between the floor and the baking chamber. Because of this effect, the temperature of a small baking chamber will fall quickly at the beginning of the baking cycle, but recover quickly when sensing and control turn the heat source on to cause hot combustion gas to immediately fill the baking chamber. In contrast, cold dough removes large quantities of heat energy from the top of the high mass refractory floor during the bake cycle. The top of the floor is unavailable for heating by hot gas in the baking chamber as the top of the floor is insulated from the baking chamber by the pizza, any heating of the baking surface during the baking cycle can only occur from the bottom of the floor, as heat diffusion through the high mass floor, a much slower process, that takes more time and more heat energy. The problem is magnified by baking pizzas in rapid sequence in one area on the baking surface, before the floor has completely refreshed to target temperature.

During the baking cycle, when the top surface of the floor is unavailable for sensing control and heating, the bottom surface of the oven floor becomes the best available target for sensing control and heating. At best, sensing of the bottom surface of the oven floor gives indirect information about the temperature of the top of the floor, on the other side of the refractory mass of the floor. It takes time for cooling at the top of floor to cause cooling at the bottom surface, such that sensing, control and heating can begin to offset heat losses at the top of the floor by heating the bottom, and even longer for heat to diffuse across the refractory mass of the floor to correct for and offset heat losses at the baking surface. The bottom of the oven floor can be sensed, controlled, and heated to target temperature well before the top of the floor has reached target temperature. In fact, the bottom floor process temperature can exceed the high temperature limit of the controller, switching the heat source off, well before the baking surface has returned to target temperature. This phenomenon delays the return of the baking surface to target temperature, prolongs oven refresh time, and limits the capacity of the oven to bake pizzas in rapid sequence.

In some embodiments of the current invention, sensing of infrared light emitted from the bottom surface of the oven floor is used to generate signals for an oven temperature controller that operates a relay arranged in series with a relay actuated by a temperature controller receiving signals from a sensor measuring infrared light emitted from the top surface of the oven floor. With this control system, if bottom surface controller high and low temperature limits are set at temperatures higher than the top surface controller high and low temperature limits, then, in the empty oven, the top surface of the oven floor will come to target temperature and initiate hysteresis cycling based on the settings of the top surface controller because the limits of the top surface controller will be satisfied before the limits of the bottom surface controller. The empty oven floor temperature will be controlled by baking surface temperature regulation.

If the bottom surface controller high and low temperature limits are set above the high and low temperature limits of the top surface controller and a pizza is placed on the top surface of the oven floor, the sensor measuring the light emitted from the top surface of the oven floor in the empty oven will sense the infrared light emitted from the top surface of the cold pizza interposed between the sensor and the top surface of the oven floor. The top surface temperature controller will receive a sensor signal that will cause the calculation of a process temperature value below the low temperature limit setting for the controller, which will end soaking and start ramping by causing the controlled relay to close, and remain closed while the top floor surface process temperature, now sensed as the surface temperature of the pizza, is below the high temperature limit of the controller. The relay will stay closed until the top surface controller process value exceeds the high temperature limit for the top floor surface controller. This never occurs during the baking cycle.

The top of the pizza never reaches the high temperature limit setting for the top of the floor. If it did, the pizza would be terribly burned. This creates a condition that causes the top surface controller relay to be always closed during the baking cycle.

Because the relays from the top surface and bottom surface controllers are arranged in series, and the top surface controller relay will be closed while pizza is in the oven, the oven floor will effectively be heated and temperature controlled only by the bottom floor surface temperature controller relay opening and closing to maintain a hysteresis cycle.

If the bottom surface temperature controller has high and low limit settings above the limit settings for the top surface of the floor, when a pizza is placed into the oven, the bottom surface temperature controller relay will close immediately because the bottom surface process temperature will be under the low limit setting of the controller. Both relays closed, the heat source will turn on, and the oven floor, as a system will begin to compensate for heat losses to the cold pizza, immediately after the event of pizza introduction into the oven. Heating at the bottom of the floor immediately begins compensation for heat losses at the top of the floor during the baking cycle.

The temperature on the bottom surface of the floor will then fluctuate between the high and low temperature limit settings of the controller, as ramping and soaking occur in sequence in a hysteresis cycle. Because the limit settings are higher on the bottom of the floor than the top, the gradient between the two surface temperatures is adjustable. Higher limit settings on the bottom of the floor will cause higher temperatures at the baking surface covered with pizza during the baking cycle.

When the pizza is removed from the oven, a larger gradient between top and bottom controller limit settings will cause a more rapid return to target temperature for the baking surface between baking cycles. In the oven, now empty, the process temperature of bottom surface of the floor will rise to the higher limit settings of the bottom surface temperature controller until the top surface process temperature exceeds the top surface controller high temperature limit, causing the top surface controller relay to open, with the baking surface at target temperature. With the bottom surface temperature controller relay closed because the higher bottom surface controller low temperature limit is satisfied and the high limit setting is not satisfied, the oven floor heat source will be effectively controlled by the top surface controller operating with lower temperature limit settings. This causes oven floor soaking and ramping in a hysteresis cycle based on top floor process temperatures.

Thus, the confounding problem encountered in trying to regulate oven floor temperatures is solved. High quality monitoring and control of the oven floor requires temperature sensing and control of two surfaces, the top of the floor when the oven is empty and the bottom of the floor when the oven is loaded. If the controller limit settings of the bottom surface controller are set above the top floor surface controller limit settings, introduction of the pizza into the oven will always cause immediate heating of the oven floor. This has the advantage of heating that immediately offsets thermal energy losses by the oven to cold dough. This shortens the time required for the top surface of the oven floor to return to target temperatures so that the oven is ready to receive the next pizza sooner and begin the next baking cycle sooner. If baking surface temperature is displayed on the empty oven, this obviates the need for a handheld IR sensor, the baking surface temperature is held waiting at target temperature in the empty oven, ready for the next baking cycle, and the time that the baking surface is under target temperature, between baking cycles, is limited. Continuous monitoring and control of oven floor temperature is uninterrupted in the loaded oven during the baking cycle.

Some embodiments of the present invention use a thermocouple at the top of the baking chamber to provide signal to a temperature controller regulating a relay controlling the power supply or signal to a dedicated dome heat source. If this dome temperature regulation system is used with the floor temperature regulation system described above, a complete temperature control system for the dome and floor would operate with independent electronic sensing of three different oven surfaces or areas, allowing independent control of the baking chamber and oven floor heat sources, providing regulation of the chamber and floor both when the oven is empty, and when pizza covers the top surface of the oven floor.

Previous art fails to disclose engineering for a system to measure the top surface temperature of a 900 degrees Fahrenheit, high temperature oven floor by an IR sensor or other means, wherein the measuring device is not handheld, as in a handheld infrared thermometer, commonly used to measure floor top surface temperature through the doors of ovens in high temperature pizza oven operation today. The instant art describes an apparatus constructed as part of the oven, or mounted on the oven, to measure the top surface oven floor temperature, and to provide for display of that temperature on the oven. Although reference to 900 degrees Fahrenheit is made in this application (as that is the temperature required to bake an Italian Pizza), the current invention is not limited to ovens which are capable of reaching 900 degrees Fahrenheit. While conventional ovens operate from about 100 to 500 degrees, high temperature ovens operate from about 100 to 1000 degrees. Moreover, reference to high temperature ovens is not meant to limit the present invention. The ovens of the present invention need not be high temperature ovens as the novel control systems and methods for regulating the temperature of the baking surface are applicable to ovens, whether such ovens are capable of the preferable high temperatures required for Italian Pizza, or not.

The invention also includes oven temperature control systems using one or more infrared sensors and other temperature sensors to measure temperatures of oven floor surfaces and temperatures in baking chambers, using that sensing to signal one or more oven temperature controllers or other control equipment to regulate one or more heat sources for continuous temperature monitoring and control of the oven floor and baking chamber temperatures during and between baking cycles.

Finally, the present invention includes ovens that use these technologies with novel systems to illuminate the oven, insulate and ventilate oven walls, rotate oven floors, and keep heat sensitive components cool with powered ventilation, remote location, baffles, and shutters or moving doors, for example.

Apparatus for Measuring the Temperature of a High Temperature Oven Floor Surface.

The apparatus of this invention allows infrared light sensing by a sensor positioned in a cool location outside of an oven baking chamber, measuring infrared light emission from parts of the oven floor protruding from the baking chamber, or measuring infrared light emission from an surface of an oven floor, top or bottom or side, preferably the top, through one or more ports or other openings in the structural confines of the baking chamber vents and other surrounding structures that are interposed between the oven floor and the infrared light sensor. Powered ventilation may be used to interfere with hot exhaust gas inside the baking chamber rising out of the chamber directly or through a port or opening to impinge on and cause heat damage to an infrared sensor. Powered air flow to cool the sensor may be arranged using positive air pressure to blow hot air away from the sensor or the space between the port and sensor, or any space between the oven floor and sensor. Negative pressure may be arranged to suck hot air away from the sensor or the space between the port and sensor, or any space between the oven floor and to sensor. Positive pressure may be used to force hot air normally escaping up through the port, down the port, or otherwise ventilate the area inside of the port, to limit hot baking chamber exhaust gas from flowing towards and impinging on the sensor or the area around the sensor. More than one port or opening may be used to allow infrared light emitted by the oven floor surface to impinge on the sensor for measurement. Ventilation, positive or negative, may be used between multiple ports in any space between the oven floor and the sensor to prevent hot air from moving through them to damage the sensor.

Because ventilation of the sensor may be powered, a primary power failure may cause unplanned cessation of ventilation, leaving the sensor unprotected from hot exhaust gas rising out of the baking chamber. To prevent this, there may be a battery powered system with or without a battery charger, to provide a second ventilation power supply to prevent ventilation failure during a primary power supply failure. Shutters, or other mechanisms causing mechanical closure during power failure of a port, opening or any space between the oven floor and sensor to obstruct hot air that would otherwise impinge on and damage the sensor, may be used.

Baffles between the sensor and oven floor may be used to defend the sensor from heat. Remote location of the sensor outside of the baking chamber, away from the hot oven floor, particularly in areas where hot oven chamber gasses would normally draft, may also be used to defend the sensor from heat damage.

Infrared Sensor Oven Temperature Control Systems

The present invention also relates to oven temperature control systems that use infrared light sensors to measure infrared light emissions from the top surface of an oven floor, to calculate temperature and display the temperature of the surface of the top of the oven floor on the oven so that it is visible to the operator. The sensor provides signal to an oven temperature controller that allows high and low temperature limit setting and regulation of a relay that actuates a heat source located in or under the oven floor. This system may be used with or without a second infrared sensor that senses infrared light emissions from the bottom surface of the oven floor, providing signal for the calculation of temperature, for temperature display on the oven, and for operation of a second industrial oven controller that allows high and low temperature limit setting and regulation of a second relay. This second relay may be arranged in series with the relay regulated by the temperature controller receiving sensor data from the top surface of the oven floor. This arrangement of two relays in series allows for the heat source to be off if either top or bottom surface floor temperatures exceed their high temperature limit settings. It also allows for the heat source to be on if process temperatures sensed on top and bottom surfaces fall below the low temperature limit settings of both controllers. Each of the two controllers will function to control their relays to operate hysteresis heating cycles, gaining heat or "ramping" after low temperature limits are reached, and losing heat or "soaking" after high temperature limits are exceeded. Because the relays are in series, both controllers must close their relays to power the burner, though only one relay will need to open to discontinue heating. Controller relays are closed, powering the heat source, when the controller high temperature limit has not yet been reached at start up or, during the hysteresis cycle, after the process temperature falls below the low temperature limit setting on the controller. This causes the relay to close, ending soaking and beginning ramping. During hysteresis cycle operation, either controller relay, alone, if opened, will interrupt power to the heating element until the low temperature limit setting for that controller is reached. Because the relays are arranged in series, process values for both temperature controllers must fall below their low temperature limits to allow the closure of both relays to power the underfloor burner. Low temperature limits are set as an adjustable defined negative deviation from the adjustable high temperature limit setting. In this way, both the top and bottom surface temperatures of the oven floor are adjustable and controlled within the limits of the physics of the system.

The importance of the capacity to use top and bottom floor surface temperatures to regulate the temperature of an oven floor is not believed to be obvious to those skilled in this art. In an empty oven, it is most important to know if the top surface of the floor is hot enough to receive a pizza to bake. Top surface temperature is very important to control and display. Once pizza is in the oven, the top surface of the oven floor is covered with pizza, and unavailable for temperature sensing, control or monitoring by any system described in the current art. The top floor surface infrared sensor will sense the infrared light emission from the cold pizza placed between the floor and the sensor, or patches of empty floor and cold pizza on large oven floors, and close the top surface controller relay because the surface process temperature is under the low temperature limit setting. The top surface oven floor controller relay will close and remain closed during the baking cycle because the process temperature of the cold pizza will never reach the high temperature limit setting for the top floor baking surface during the baking cycle. Because the top floor baking surface controller is arranged in series with the bottom surface controller, the circuit powering the floor heat source will, in the loaded oven condition, effectively be controlled by the bottom surface controller, because the top surface controller relay is always closed during baking. The bottom surface controller will open its relay when the bottom surface high temperature limit is exceeded and close the relay when oven floor bottom surface temperature falls below the low temperature limit setting, a preset deviation from the high temperature limit set point. In this way, an oven floor hysteresis heating cycle and oven floor temperature regulation is possible even when infrared light emission cannot be measured from the top surface of the oven floor because infrared light emission from the top of the oven floor is obstructed by pizza. Regulation of oven floor temperature during the baking cycle is especially important in low temperature, long duration baking cycles.

The unique capacity to sense, regulate and control the process temperature of both the top and bottom surfaces of the oven floor allows, within the limits of the physics of the system, operator control of the temperature gradient between the top and bottom surfaces of the oven floor. If the bake cycle is long, as in low temperature baking, setting bottom surface temperature limits slightly above the top surface temperature limits (for example, 10-20 degrees Fahrenheit higher than the top surface temperature limit), will maintain the top surface temperature of the floor at limit when empty, and lower than the bottom surface high temperature limit when pizza is covering the oven floor. This is a small gradient setting.

If short baking cycles at high temperatures are desired, the bottom surface temperature limit can be set significantly higher than the top floor temperature limit. For example, the bottom surface temperature limit can be set 30-50 degrees Fahrenheit higher than the top floor temperature limit. In this way, in the empty oven, when the top floor process temperature is at target temperature and its controller relay is open, the bottom floor surface controller relay will be closed because it is under temperature relative to a high temperature limit set point that is significantly higher than the top plate setting. When a cold pizza is introduced into the oven, the top surface sensor measures the temperature of the cold pizza (or cold pizza and oven floor in large ovens) and closes the top floor surface controller relay. Because the bottom surface is under target temperature in the empty oven and the bottom floor controller relay is already closed, the circuit is immediately completed, and the heat source is actuated when the top floor surface controller relay closes. Because both relays are closed, and the floor heating element is immediately powered when the pizza is placed on the floor, the oven system thermal losses to the newly introduced cold pizza immediately begin to be offset. When bottom surface limit temperatures are reached, the bottom surface temperature relay opens, heating stops at a to controlled bottom surface high temperature limit, allowing indirect control of the baking temperature on the floor top surface, which is unavailable for monitoring during the bake cycle because it is covered by pizza.

By changing the difference between the top and bottom surface temperature settings, the temperature gradient between the top and bottom surface temperatures can be controlled within the physical limits of the system. Controlling this gradient allows stabilization and control of peak top plate process temperatures during long baking cycles. By making the gradient larger in small ovens, more thermal energy can be added to the oven floor immediately on introduction of the cold pizza to the oven, offsetting thermal losses immediately at the start of the bake cycle, limiting the time for, and degree of, oven floor process temperature deviation from target temperatures. In turn, this limits the time for the top surface of the oven floor to return to target temperature. Top floor process temperature negative deviation from target temperature during the baking cycle, and after the pizza is removed from the oven, is limited in this way, reducing the time the oven is unusable for baking the next pizza because the top of the floor is under target temperature. This limits the time after one pizza is removed from the oven and before the next baking cycle can begin. Once at target temperature, the controllers will then hold the top surface of the floor at a target temperature while the oven is empty.

This control system may be used alone or in combination with a system to measure the temperature of the surface of the top of the baking chamber or dome, the material of the body of the dome, or the air close to the surface of the dome, typically with a thermocouple. This allows display of the temperature of the dome on the oven, and the use of an industrial oven controller to open and close a relay that regulates power to a dedicated dome heating system located in or under the dome. Such a system may provide for temperature regulation of the dome, independent of the system used to heat and regulate the temperature of the floor.

It is also possible to use a system of control wherein one or more oven temperature controller outputs is are variable and proportional to the degree that process temperature deviates from a target temperature setting, providing regulation of one or more variable output heat sources that generate more or less heat depending on the amplitude of an incrementally variable signal from the proportional signal controller.

It is also possible to use a system of control wherein oven floor top surface sensor temperature data is monitored by a computer system that identifies the introduction of cold pizza into the oven by the abrupt drop in the temperature reading of the top surface of the oven floor caused by the interposition of cold pizza between the sensor and the floor, and triggers a computerized burner heat output algorithm that varies temperature over time on multiple monitored surfaces, in a programmed bake cycle, with our without monitoring of pizza surface temperature and other sensor input to end the bake cycle or change heat supply over time to optimize the characteristics of the baking cycle and minimize time to target temperature in an empty oven after a baking cycle.

High Temperature Pizza Ovens

Finally, the present invention relates to embodiments of high temperature pizza ovens that use the described top floor surface temperature IR sensing apparatus to signal a temperature controller that regulates a relay that powers a dedicated underfloor heat source. These ovens may also use an infrared sensor to measure the temperature of the bottom surface of the oven floor to provide signals to a controller that operates a relay that may be arranged in series with the controller relay that is regulated by using temperature readings from the top surface of the oven floor to power a dedicated underfloor heat source. These ovens may also have a dome temperature sensing system for a temperature controller regulated relay that powers a dedicated heating system in or under the dome.

These ovens may have a ventilated space between the structural confinements of the baking chamber and the outside surface structure of the oven. An insulation layer may be positioned in that space, and ventilation may be provided in the space between the exterior surface structure of the oven and the insulation layer and its containment, or in the space between the structural containment of the baking chamber and the insulation layer and its containment. Ventilation may be provided by positive or negative air pressure.

These ovens may have doors with a ventilated space between the inside surface structure of the door and the outside surface structure of the door. Insulation may be provided in the door between the inside and outside surface structures of the door. Ventilation in the door may be provided between the outside surface structure of the door and an insulation layer with containment, or between the inside surface structure of the door and an insulation layer with containment, or in both spaces inside of and outside of the contained insulation layer. Ventilation in the spaces may be from positive or negative pressure.

The insulation layer may be a vacuum chamber comprising an inside and outside structural boundary with a vacuum between the boundaries. The inside boundary may be the physical structure of the baking chamber, the outside structure may be the exterior surface of the oven. Ventilated spaces inside or outside of the vacuum chamber insulation may be used as above.

These ovens may or may not have an underfloor chamber or area under the oven floor that may be fixed, or rotating with the oven floor, attached to the oven floor or the structure that supports it, or unattached; bounded at the top by the bottom surface of the oven floor, bounded at the sides by structural perimeter walls, open at the bottom, or structurally connected to the flat bottom structure supporting the burners in the area under the oven floor, or constructed as two parts, a bottom part that is fixed to the bottom surface of the burner box or other structure and a top part that is attached to the oven floor and rotating with it, wherein the first heat source is contained inside of or located under the underfloor chamber, and wherein discharge of hot gas heating the bottom surface of the oven floor and accumulating inside of the underfloor chamber is discharged from the underfloor chamber, into the baking chamber, the external environment, or oven ventilation system, or combination thereof, in a way that may or may not allow selection of the destination of the exhaust gas in total or in part.

These ovens may have insulation provided by a structure(s) that forms a closed space containing a vacuum.

These ovens may be constructed so that the drive mechanism that causes rotation of the oven floor and the structure that supports it about a vertical axis is a solid axle, or a hollow axle open at its center to convey fuel or electrical power to a heat source located inside of or under the rotating oven floor, or a hollow drum structure oriented on vertical axis, open at the top and bottom, supporting the oven floor at its top edge, and rotating on a perimeter bearing system on the bottom of its structure, allowing sensing, ignition and heat source equipment to be maintained inside of the drum.

These ovens may have powered ventilation to cool light shafts, with or without shutters and back up power supplies for light source protection during power failures.

These ovens may have powered ventilation for the exhaust fan blower motor or other motors or heat sensitive components.

These ovens may have a light source located outside of and or under the baking chamber, and or in the door.

These ovens have capacity for infrared sensing of a surface of an oven floor, with or without sensing through a port or other opening in the confines of the insulation around the baking chamber and the baking chamber wall, with or without sensing of that part of the floor that protrudes from the front of the oven, with or without infrared sensing through ports or openings in the structural elements of an exhaust vent or flue constructed with or without positive or negative powered ventilation outside of the vent or flue between the sensor and the confines of the vent or flue.

These ovens may have various electronic controller settings. For example, these ovens may have up to six electronic controller settings: dome high temperature limit, dome low temperature deviation limit, baking surface high temperature limit, baking surface low temperature deviation limit, oven floor bottom surface high temperature limit, and oven floor bottom surface low temperature deviation limit.

These ovens may have 5 fuel supply settings: dome ramp fuel supply valve, dome soak fuel supply valve, floor ramp fuel supply valve, floor soak fuel supply valve, pilot fuel supply valve.

BRIEF DESCRIPTION OF THE SEVERAL VIEWS OF THE DRAWINGS

For a further understanding of the nature, objects, and advantages of the present invention, reference should be had to the following detailed description, read in conjunction with the following drawings, wherein like reference numerals denote like elements and wherein.

GLOSSARY OF TERMS

Dome—The physical structure of the top surface of the baking chamber, or the area at the top of the baking chamber.
Oven Chamber— Baking chamber, area in which the food bakes.
Baking Surface—Top surface of the oven floor.
Oven refresh time—the time between the ending of the last bake cycle and the return of the baking surface to target temperature, signaling readiness to begin the next bake cycle.
Hysteresis cycle—The process of an area or surface increasing in temperature while heating occurs, and then dropping in temperature when heating is discontinued, resulting in the area or surface temperature being held in a range, wherein the range is controlled by turning heating off at a high temperature limit followed in sequence by heating being turned on at a low temperature limit.
Ramp or ramping—The part of the hysteresis cycle wherein the reference area or surface is being heated and the temperature is rising.
Soak or soaking—The part of the hysteresis cycle wherein the heat supply is off, and the reference area or surface temperature is falling.
IR sensor-Infrared sensor. Senses infrared light emissions from surfaces and translates measurements to an electrical current signal.
Process value or temperature— a measured parameter e.g. temperature that is monitored and changes during an operation High temperature limit setting-a controller setting that causes the opening of a controller relay and cessation of heating when the process value is higher than the limit setting.
Low temperature limit setting—a controller setting, generally set as degrees of negative deviation from the high temperature limit setting. When process temperature falls below the low temperature limit setting the controller closes a relay to cause heating.

DETAILED DESCRIPTION OF THE INVENTION

Oven Floor Top Surface Infrared Temperature Sensing Apparatus

Figure 1:
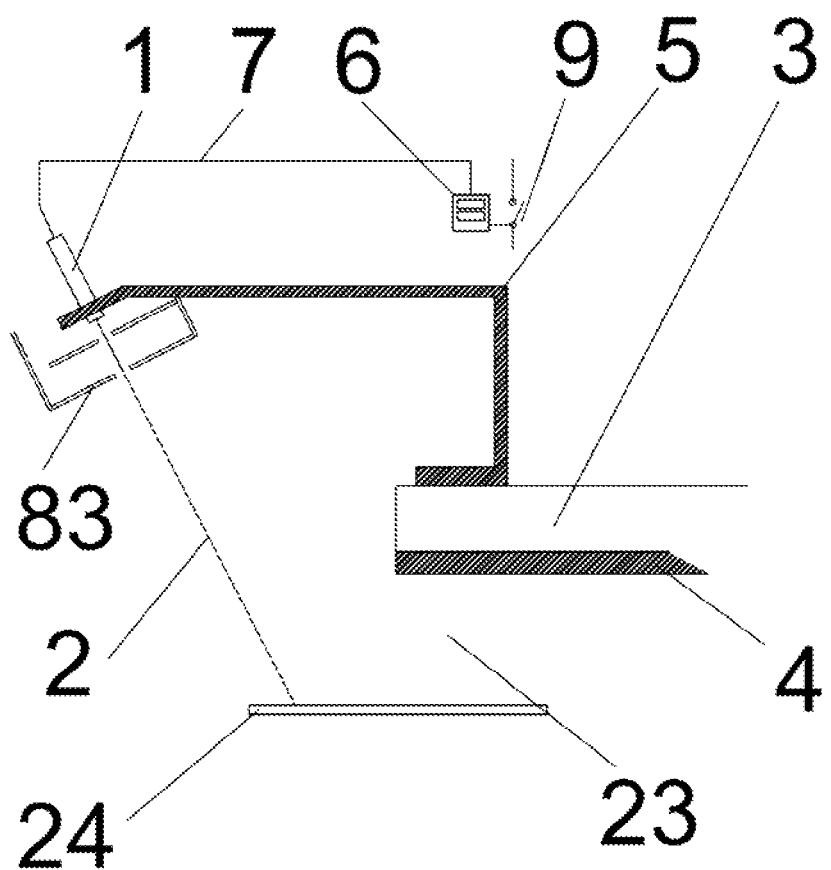
FIG. 1 is a right-side schematic cut away view of a simple embodiment of a top floor infrared sensing apparatus. The front of the oven is on the left.

FIG. 1 is a simple configuration of the oven floor top surface infrared temperature sensing apparatus of an embodiment of the apparatus of the current invention. Bracket 5 supports IR sensor 1 so that the sensor is located outside of the baking chamber 23, above the top surface of the oven floor 24, in an environment cooler than the top operating temperature of the sensor (which may be, for example, 250 degrees Fahrenheit). Positions to one side of center, positions in front of the baking chamber and or positions high above the baking surface can be cool enough to allow the sensor to function by sensing around an axis like axis 2. IR sensor positions in the baking chamber and embedded in the top walls of ovens are not included in preferred embodiments of the present invention because they are too hot to allow sensor operation. The sensor should preferably be in a position to avoid hot gas escaping out of the baking chamber 23, from under the top wall, or dome of the baking chamber 4, covered by insulation layer 3.

The sensor may or may not be further defended by baffles 83 between the open front of oven chamber 23 and the sensor 1. The signal lines 7 of the sensor 1 may be wired to controllers 6 allowing top floor surface temperature displays on the controller and relay switching 9 to power or control signals to heating elements to change the temperature of the floor. These elements may be considered part of the IR sensing apparatus.

Note should be made that sensor 1 and bracket 5 may not actually be attached to the oven, as positions on walls or ceilings or other structures may provide locations for the sensor that would still allow, with proper optics, sensing of the top floor surface temperature and the display of that temperature on a controller fabricated as part of the oven or separate from it. This may still be used with wiring for the controller relay circuit powering or signaling the heat source. In a similar way, the controller 6 need not be attached to the oven, except by the electrical lines of the circuits that may or may not be switched by the relay operated by the controller 9 receiving signal from a sensor through sensor signal line 7. Power lines for the components, negative signal lines, ground wiring, and housings for the components are not shown.

Figure 4:
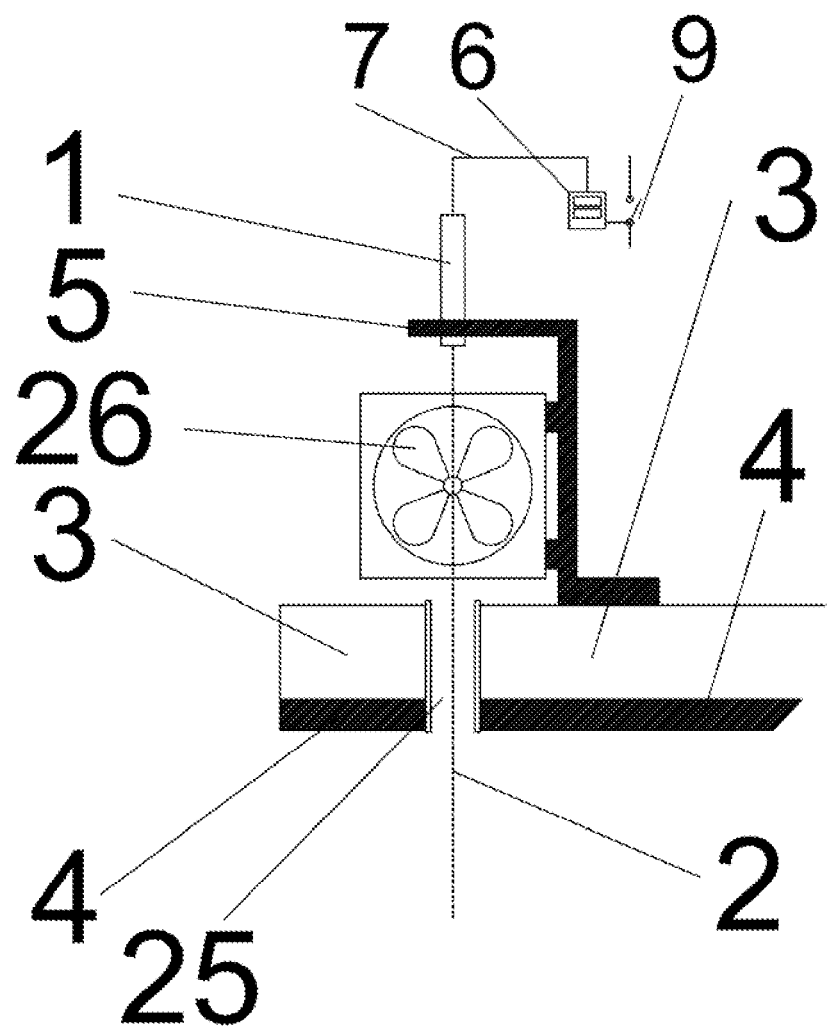
FIG. 4 is a right-side schematic cut away view of the top floor infrared sensing apparatus showing sensing through a port that traverses the material structure of the top of the baking chamber and the insulation layer on top of it.

FIG. 4 is a right-side cutaway schematic of an oven floor top surface temperature infrared sensor apparatus shown with two additional complexities. A port 25 in the top of the oven has been introduced, traversing the insulation layer 3, and the structure of the top of the baking chamber 4, allowing IR sensor 1 to sense the temperature of the top surface of the oven floor 24 along axis 2. The sensor 1, port 25 and bracket 5 may be used with or without a fan 26 to provide airflow between the IR sensor 1 and port 25 to protect the sensor from hot gas drafting up through port 25 which would otherwise cause heat damage to the sensor. These features allow the sensor 1 to be located closer to the oven chamber and directly over the oven floor 24 surface, a location more convenient for oven operation and manufacturing. The fan 26 provides airflow to push or suction hot gas rising through port 25 away from the sensor 1 positioned directly over the port. The apparatus may not require a fan if the sensor optics allow a sensor location far enough above port 25 to avoid heat damage from hot oven chamber gasses, or if an oblique angle of attack is arranged through port 25 so that the path of hot gas rising in a vertical direction out of the port misses the sensor positioned outside of a central vertical axis over the port.

The sensor may be further defended by baffles 83 as in FIG. 1 (not shown in FIG. 4).

The signal lines of the sensor 7 may be wired to controller 6 allowing top floor surface temperature displays on the controller and relay switching 9 to power heating elements to change the temperature of the floor. Signal lines, the controller, and relay may be considered elements of the apparatus. Power lines for the components, negative signal lines, ground wiring, and housings for the components are not shown.

Figure 7:
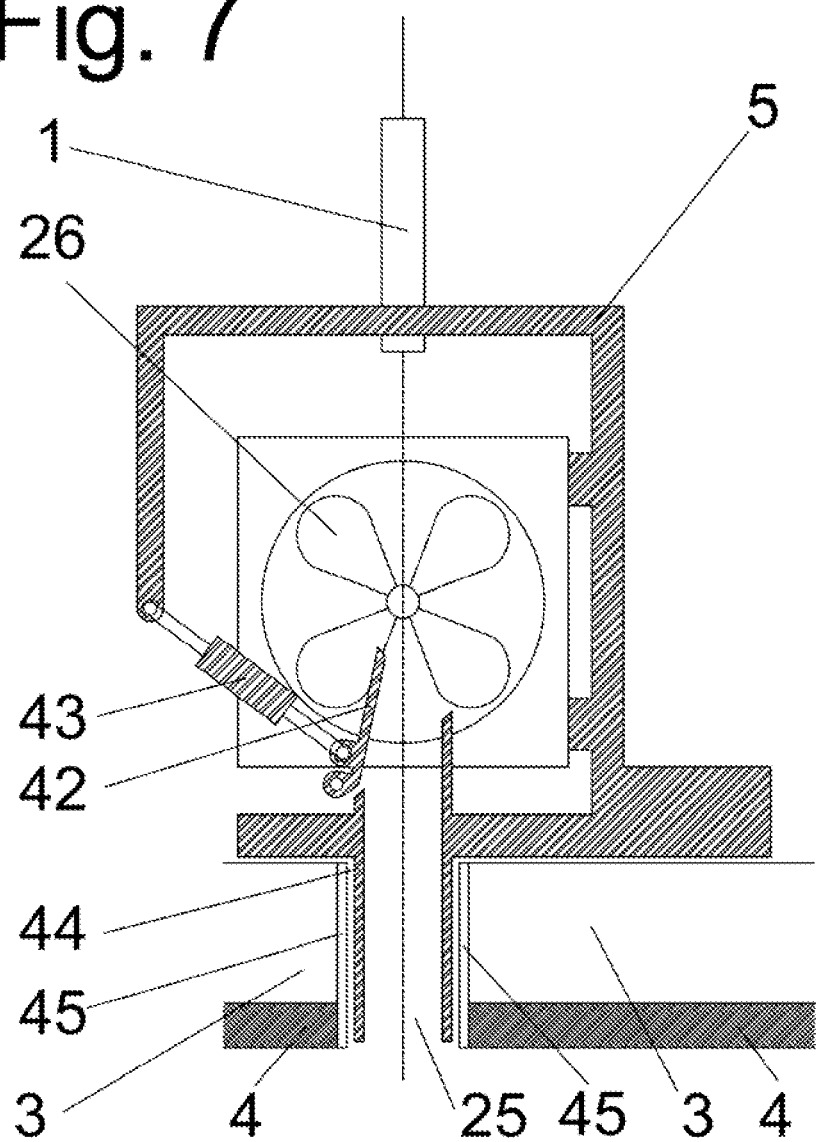
FIG. 7 is a right-side schematic cut away view of an embodiment of a top floor IR sensing apparatus that uses forced air to defend the sensor from hot gas rising up through the port during normal operation and a shutter moved by a linear actuator to prevent hot gas from rising up through the port during a power failure.

FIG. 7 is a drawing of a top surface oven floor temperature IR sensing apparatus now shown over a port 25 using a fan 26 to provide airflow between sensor 1 and the top of port 25 to prevent hot gas from rising up and out of port 25 to cause heat damage to the sensor 1 located directly above the port 25. Also shown is a shutter 42 that is normally closed over the top of port 25 when the oven is off. The shutter 42 can be opened by solenoid actuator 43 during operation. During normal operation, the solenoid is powered, causing the shutter to open so that IR sensing can occur through an open shutter 42 and port 25. In the event of a power failure, however, the fan will lose power, stopping airflow between the sensor 1 and the port 25, leaving the sensor 1 unprotected from hot gas rising through port 25. To prevent this damage during a power failure, the solenoid 43 will also lose power, causing the shutter 42 to close, preventing hot gas from rising through port 25 and damaging the sensor 1. In this way the IR sensor 1 can be defended from hot gas rising through port 25 both when the apparatus is powered and when it is not.

Another method of sensor protection during a primary power failure is the construction of a backup power supply (not shown) for fan 26 from a battery with a charger (not shown) powered by the primary power source. In this way, during a primary power source failure, the battery backup power source could power the fan 26 so that the required protective ventilation for the sensor 1 would be uninterrupted until the oven chamber cools, even in the event of a primary power source failure. Either the solenoid shutter system, or the battery backup power system, can be used alone or in combination to protect the sensor from heat damage during a primary power source failure. The inside sleeve 44 of port 25 is attached to the apparatus and fits into an outside sleeve 45 which is attached to the oven dome structure 4 and insulation layer 3.

Figure 10:
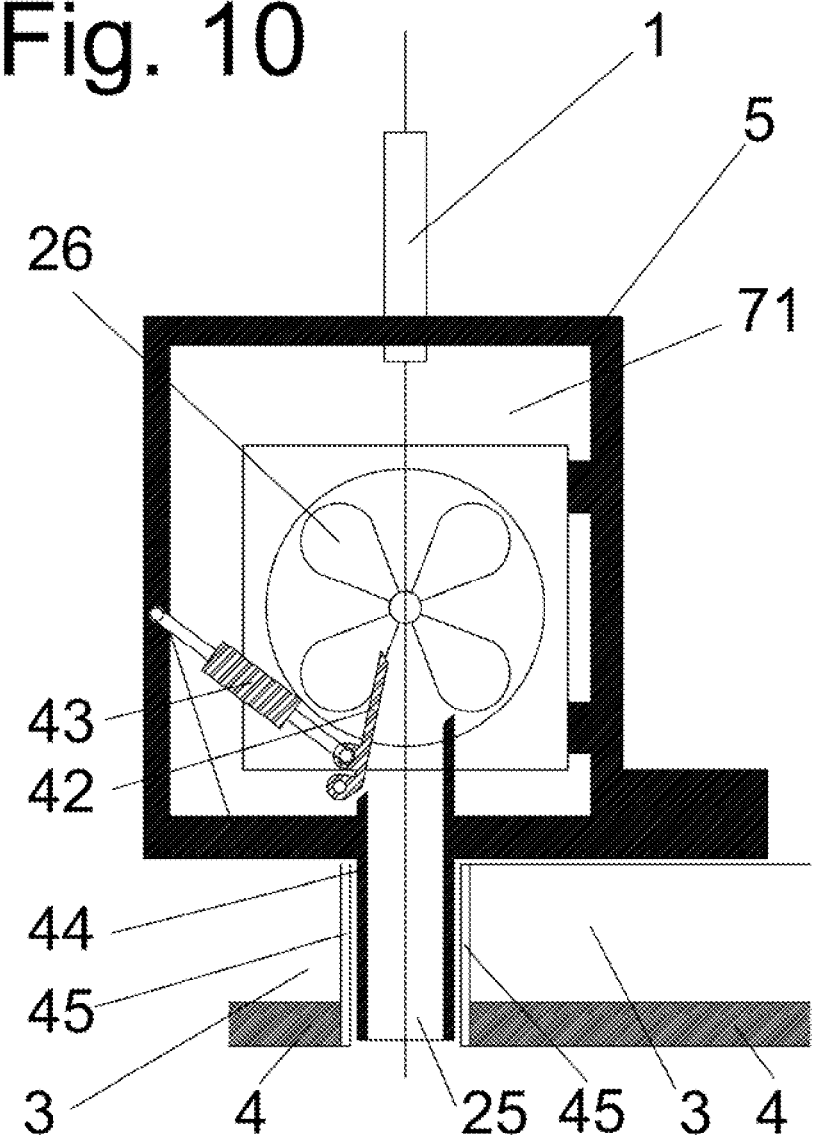
FIG. 10 is a right side view schematic cut away view of a top surface floor IR sensing apparatus featuring a fan blowing air into, and pressurizing a closed chamber, forcing cool air down or limiting hot air coming up through the port providing the opening for IR sensor readings of the infrared light emissions from the oven floor below the port. The solenoid opens the shutter over the port when powered and closes it in the event of power failure.

FIG. 10 shows an oven floor top surface temperature IR sensing apparatus much like the one shown in FIG. 7, but all sides of the chamber are closed. The only openings in the chamber include an opening for the fan intake and the opening down the port. The IR sensor 1 is mounted in the top of the chamber, above the top opening of port 25. The shutter 42 and solenoid 43 are contained within the chamber. Fan 26 is mounted on the side or top of the chamber, forcing air into the chamber, pressurizing it, so that the hot gas that would normally draft up and out of port 25, to cause heat damage to the sensor 1, is forced down port 25 into the vent chamber or baking chamber below. In this way, the IR sensor is defended from heat damage caused by hot oven chamber gasses during normal operation.

Backup power for the fan 26 with battery and charger (not shown), and, or, a shutter 42 that closes over the port 25 when solenoid 43 is not powered, may provide for protection of the IR sensor in the event of primary power failure. The inside sleeve 44 of port 25 is attached to the apparatus and fits into an outside sleeve 45 which is attached to the oven dome structure 4 and insulation layer 3.

Figure 15:
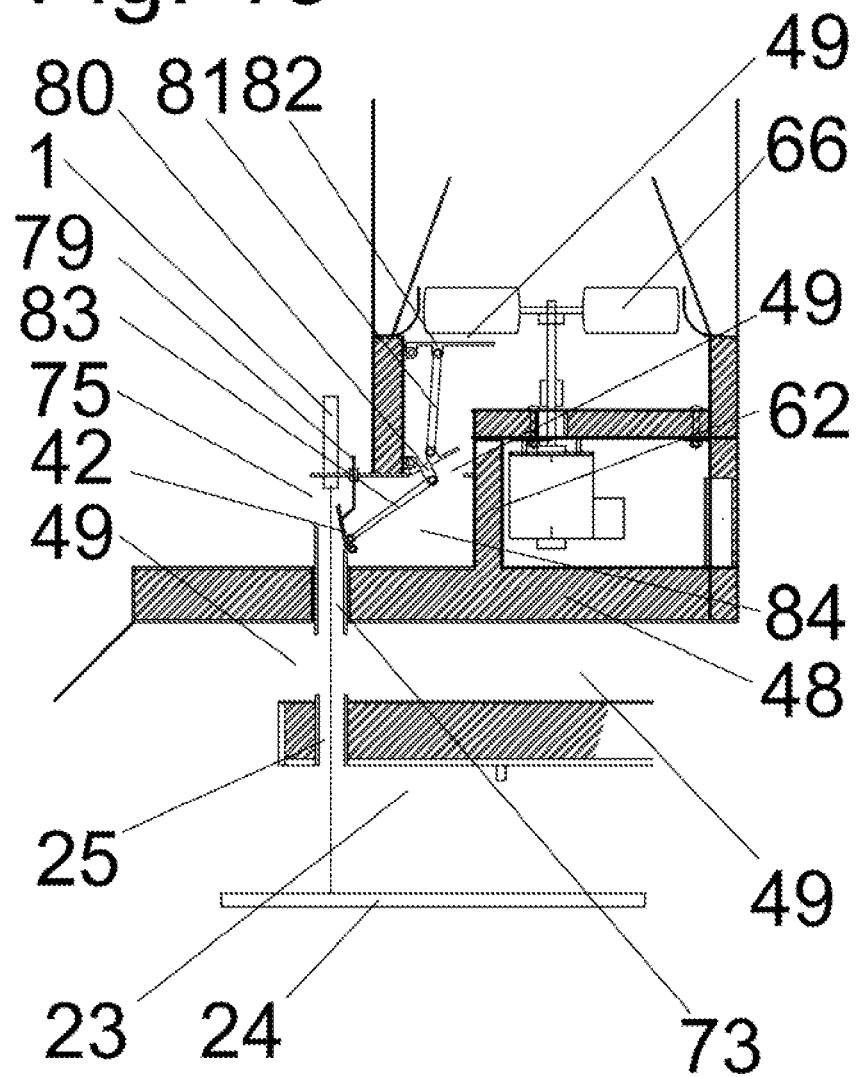
FIG. 15 is a right-side schematic cut away view of an IR sensor cooled by mechanical ventilation generated by the negative pressure provided by the exhaust fan in the vent hood. The negative pressure in the vent hood causes mechanical movement of a door to the chamber containing the IR sensor, opening it so that the air flow generated by the negative pressure can cool the sensor. A shutter is shown to protect the sensor from hot gas moving up the port during a power failure. An insulated contact electrode is shown, contacting the shutter in the open position, causing closure of the circuit usually connected to the pressure switch terminal on the ignition control module. The exhaust vent is ventilated around the structure shown on the sides of the IR sensor ventilation apparatus (front of the oven is on the left, the left side of the oven is behind the plane of the drawing and the right side is in front of the plane of the drawing)

FIG. 15 shows an oven floor top surface IR sensing apparatus in a right-side cutaway schematic drawing. An oven ventilation system is integrated with the IR sensing mechanism and uses the negative pressure in vent 49, just underneath fan blades 66 to lift a metal flap 82 that pulls a flue cap linkage 81 to open a flue cap 80 allowing sensor chamber 84 to be ventilated by the exhaust vent negative pressure 49. Cool fresh air source/negative pressure area 75 allows cool air to flow past sensor 1. A shutter linkage 79 allows the mechanism to open the shutter 42 so that sensing can occur through ports 73 and 25. Also shown is an electrode 79 in contact with the grounded shutter providing a closed circuit to verify effective ventilation and change of state by the control module for ignition.

Oven Infrared Sensing Control Systems

Figure 2:
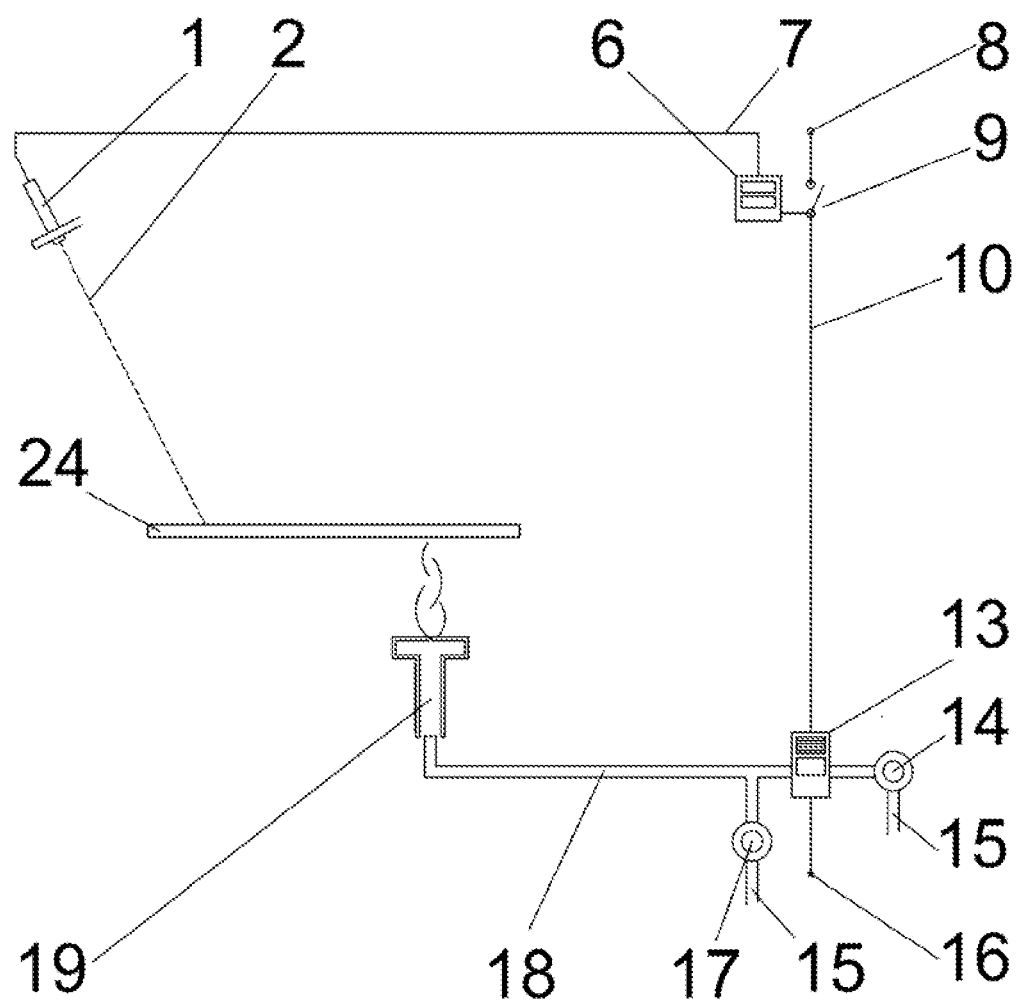
FIG. 2 is a right-side schematic cut away view of a simple embodiment of a control system for ovens of the current invention.

FIG. 2 depicts an oven temperature regulation system that uses an infrared sensor 1 to sense the temperature of the oven floor 24 around axis 2 and to send an electronic signal through wire 7 to controller 6. Controller 6 operates a relay 9 that closes to complete a circuit from the positive or line power side of the circuit 8 to the positive terminal of a solenoid gas valve 13. Solenoid gas valve 13 is normally closed but opens when powered by the relay to allow gas from gas supply line 15 to flow to the common fuel line 18 for combustion by the burner 19. A ball or needle valve 14 is arranged in series with the solenoid valve 13. This allows for gas supplied to the burner by the variable fuel supply line controlled by the solenoid valve to be adjustable when gas flow to the burner 19 occurs through an open solenoid valve 13. Solenoid valve 13 is open when the oven ramps or gains temperature. Needle or ball valve 14 becomes a way to regulate the fuel supply during ramping which changes the speed of ramping. Also shown is needle or ball valve 17, positioned between the fuel supply 15 and the common fuel supply line 18 for burner 19. Needle or ball valve 17 adjusts a constant fuel flow to the common fuel line 18 for burner 19 that is independent of the fuel supplied when the solenoid valve 13 is open for ramping. Needle or ball valve 17 can be set so that the surface of the oven floor loses temperature slowly when the solenoid valve 13 is closed. This becomes a means to adjust the soak portion of the hysteresis regulation cycle. Soaking fuel supply is typically set so that the surface loses temperature slowly. The rates of ramping and soaking are set by needle or ball valves 14 and 17, respectively.

The high temperature limit for the top surface of the oven floor is adjustable and can be set on the controller and may be displayed in LED lighting on the face of the controller with the measured surface temperature or "process value". When the process value reaches the high temperature limit, the controller relay 9 will open and the solenoid valve 13 will close, ending the ramp portion of the hysteresis cycle. Fuel will continue to flow to the burner 19 such that the oven floor surface will lose temperature slowly while soaking. The controller will allow an adjustable limit setting for temperature losses from the high temperature limit described above. When the process temperature falls below the adjustable limit for negative deviation from the high temperature limit, the relay will close and the solenoid valve will open, ending soaking and beginning ramping. In this way the oven surface process temperature will cycle between the high temperature limit and the soak temperature loss limit, or low temperature limit, which is expressed as an adjustable negative deviation from the adjustable high temperature limit.

Using adjustable manual gas valves to tune the oven to long ramp and soak cycles has the advantage of limiting mechanical solenoid valve cycles, extending the life of the solenoid valve.

In summary, the regulation system shown in FIG. 2 allows 4 settings within the limits of the oven physics:

Oven floor top surface high temperature limit setting;

Oven floor top surface low temperature limit setting. Set as a negative temperature deviation from the high temperature setting;

Oven floor ramp fuel supply valve setting. Changes the speed of ramping; and

Oven floor soak fuel supply valve setting. Changes the speed of soaking.

This system could be used with a mechanism to move the burner 19 from positions variously under the oven floor 24 to a position under the top of the baking chamber 23 or in-between those positions so that the baking chamber can be heated with the floor. Oven architecture can be modified to optimize heat sharing. Movable burner positions or movable baffles over the burner would allow the heating system for the baking chamber to be adjustable.

This oven allows oven floor temperature sensing when the oven is empty and will regulate the top surface temperature of the floor when the floor is not covered by pizza. If the floor is covered by cold pizza, the controller relay will close, and the burner will fire as long as the pizza is in the oven. The temperature of the oven chamber, though it may or may not be adjustable, is not automatically regulated like the top surface temperature of the floor, as shown.

Figure 16:
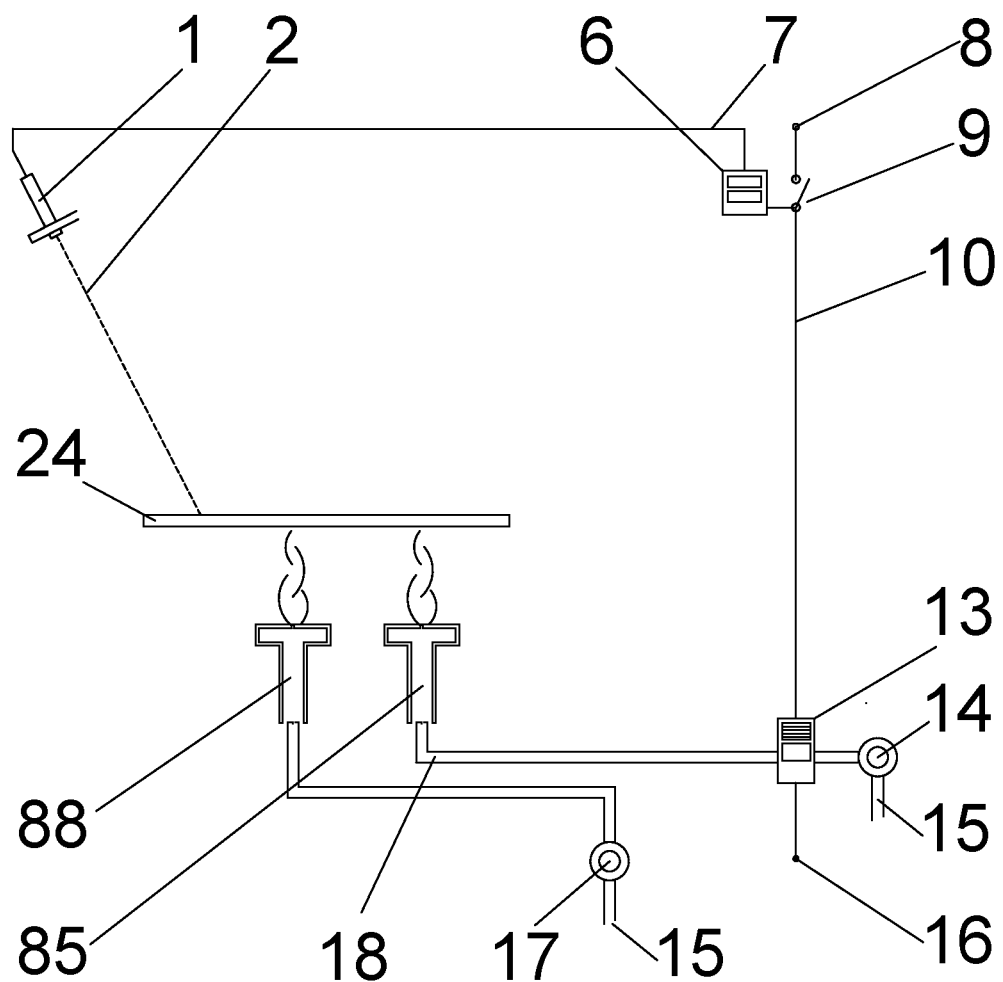
FIG. 16 is a right-side schematic cut away view of separate burners using separate fuel supplies and separate gas valves for a solenoid valve controlled adjustable variable ramp fuel supply and a constant adjustable soak fuel supply.
Figure 17:
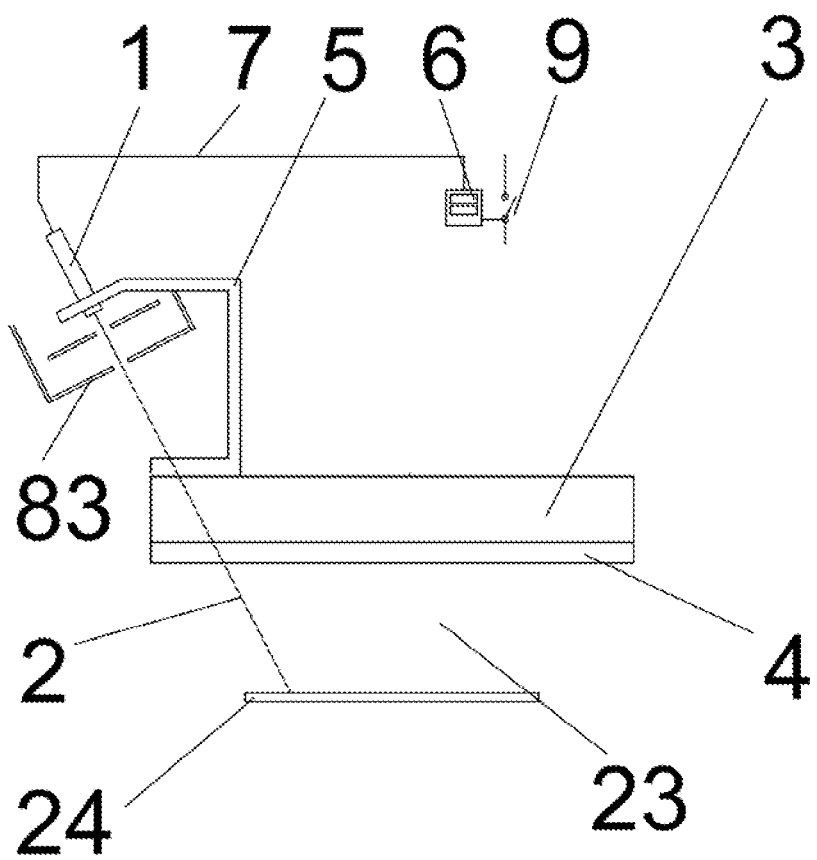
FIG. 17 is a front-side schematic cut away view of an oven with an infrared sensor defended by baffles 83, in a location remote from the oven chamber, and in a location off-center from the opening of the oven chamber, protecting the sensor from oven exhaust gas that would be hottest in the area above the center of the opening of the oven chamber, in the middle of this drawing.

FIG. 16 is a right-side view cutaway schematic of the control system shown in FIG. 2 except that the burner system is composed of two burners. The soak burner 88 is connected to fuel supply 15 and adjusted by manual valve 17 to regulate the fuel supply for the soak cycle. Burner 85 is turned off and on by solenoid valve 13 and the ramp fuel flow is adjusted by manual valve 14. Burner 85 will turn off and on, so it must rely on a pilot (not shown) or proximity to the constantly burning soak burner 88 for ignition.

Figure 5:
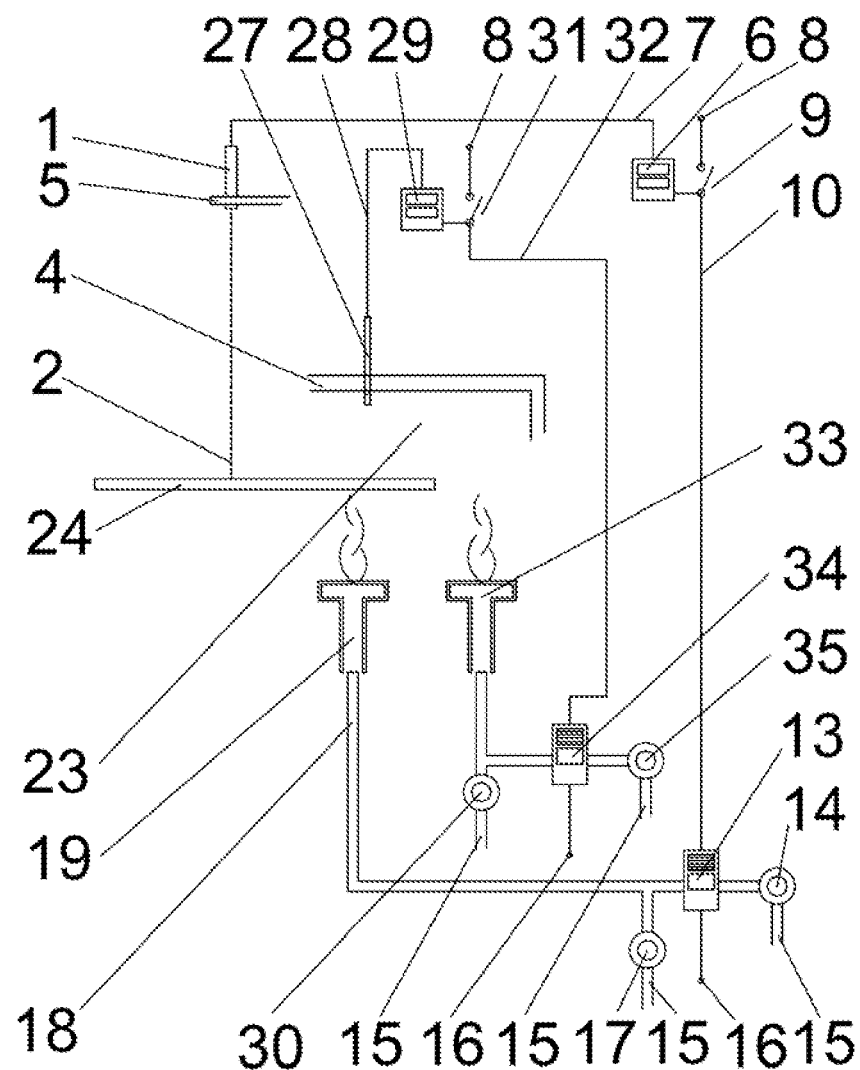
FIG. 5 is a right-side schematic cut away view of an oven control system that incorporates a dedicated burner, controller and thermocouple to regulate the temperature of the baking chamber independently of the control system used to regulate the temperature of the floor.

FIG. 5 is a right-side view cutaway schematic drawing of an oven control system shown with the front of the oven to the left. Oven top surface infrared sensor 1 remains arranged in the control system shown in FIG. 2 to regulate the top surface temperature of the oven floor, but an independent control system for burner 33 located under the top surface of the baking chamber 4 has been added. This allows independent control of a dedicated baking chamber heat source 33 and a dedicated floor heat source/burner 19.

To regulate the temperature of the baking chamber, thermocouple 27 signals controller 29 through signal line 28. Relay 31 is operated by controller 29 and closes to provide power from source 8 through line 32 to the positive terminal of solenoid gas valve 34 causing it to open and provide a ramping fuel supply from source 15 for burner 33 arranged under the top of the baking chamber to heat it. The ramp fuel supply for the baking chamber burner is adjustable by manual valve 35 and the soak fuel supply for the baking chamber burner is adjustable by manual valve 30. Manual valve 30 could supply fuel from source 15 to an independent burner for baking chamber soak, as shown in the system for the oven floor in FIG. 16 (see manual valve 17 in FIG. 16). This would allow an independent dedicated burner for baking chamber temperature ramping (see burner 85 of FIG. 16), as well.

In summary, this regulation system shown in FIG. 5 allows 8 settings within the limits of the oven physics:

Oven floor top surface high temperature limit setting;

Oven floor top surface low temperature limit setting or soak negative temperature deviation from the high temperature setting;

Oven floor ramp fuel supply valve setting. Changes the speed of ramping;

Oven floor soak fuel supply valve setting. Changes the speed of soaking;

Baking chamber high temperature limit setting;

Baking chamber soak negative temperature deviation from the high temperature setting;

Baking chamber ramp fuel supply valve setting. Changes the speed of ramping; and Baking chamber soak fuel supply valve setting. Changes the speed of soaking.

This system allows independent regulation of the top surface of the oven floor 24 and the baking chamber 23 temperatures. The regulated oven will return to target temperatures in the baking chamber 23 and on the top surface of the floor 24 when empty. If cold pizza obstructs sensing of the oven floor top surface along axis 2, the sensor will measure the temperature of the pizza, and because the pizza will always be under temperature relative to the high temperature limit setting for the top surface of the oven floor, the controller will close the relay and cause oven floor ramping as long as cold pizza obstructs sensing of the top surface of oven floor 24 along axis 2. This control system works best with high temperatures and short bake cycles.

Figure 8:
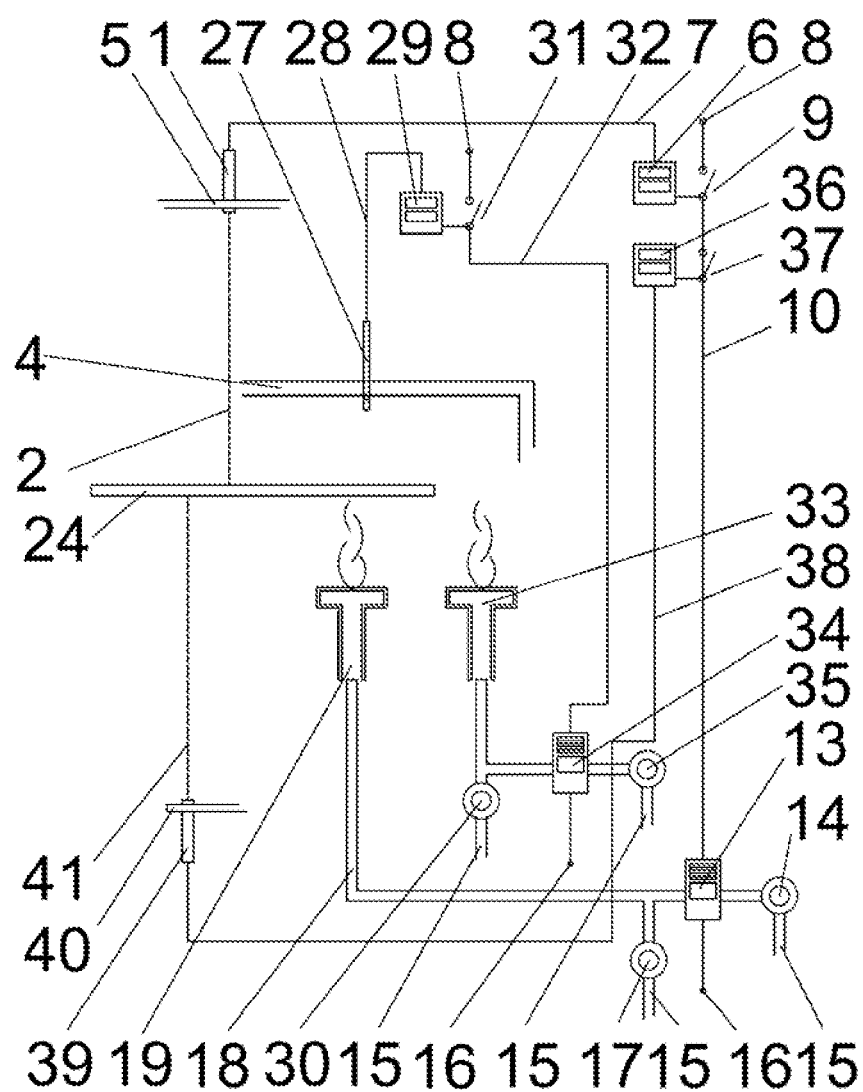
FIG. 8 is a right-side schematic cut away view of an embodiment of an oven control system of the present invention that uses infrared sensing to measure the temperature of the top and bottom floor surfaces of the oven and two controllers with relays arranged in series to control a dedicated floor burner, all operating independently of a thermocouple that measures the temperature at the top of the baking chamber and a controller that operates a relay that powers a burner dedicated to heating the baking chamber.

FIG. 8 is a right side schematic cut away view of an oven temperature regulation system that uses the elements presented in FIG. 5, but a system has been added to use an infrared sensor 39 to measure the temperature of the bottom surface of the oven floor 24 along axis 41 to allow a controller 36 to open a relay 37 interrupting the power supply 10 to the oven floor burner 19 when the bottom surface of the oven floor 24 reaches a high temperature limit. In this way, when cold pizza is placed on the top surface of the oven floor, between the infrared sensor 1 and the oven floor 24, the temperature of the cold pizza will be measured, and controller 6 will close relay 9 providing power to relay 37, arranged in series in the power supply line 10 for solenoid gas valve 13. Because relay 9 is always closed when cold pizza is interposed between sensor 1 and the top surface of oven floor 24, the solenoid gas valve 13 will open and close as relay 37 is switched by controller 36. Controller 36 controls the temperature of the floor in the loaded pizza oven as it receives signals from sensor 39, sensing the temperature of the bottom of the floor 24 along axis 41. Infrared light emissions from the bottom surface of the oven floor traveling along axis 41 are never blocked by cold pizza. This allows regulation of the oven floor temperature when infrared light emissions from the top oven floor surface are obstructed by cold pizza placed in axis 2.

This oven temperature control system allows for control of the top surface temperature of the oven floor 24 when the oven is empty. The system allows control of the bottom surface of the oven floor 24 when the oven is loaded. The system allows for independent control of the temperature of the baking chamber.

Note should be made that relays 9 and 37 can be arranged in parallel between power source 8 and solenoid gas valve power line 10, but the loaded pizza oven will ramp as long as pizza obstructs IR sensor 1 along axis 2. If controller relays are arranged in parallel, an operator can choose to control the top surface, bottom surface or both surfaces by turning off one of the controllers or leaving both on.

Figure 18:
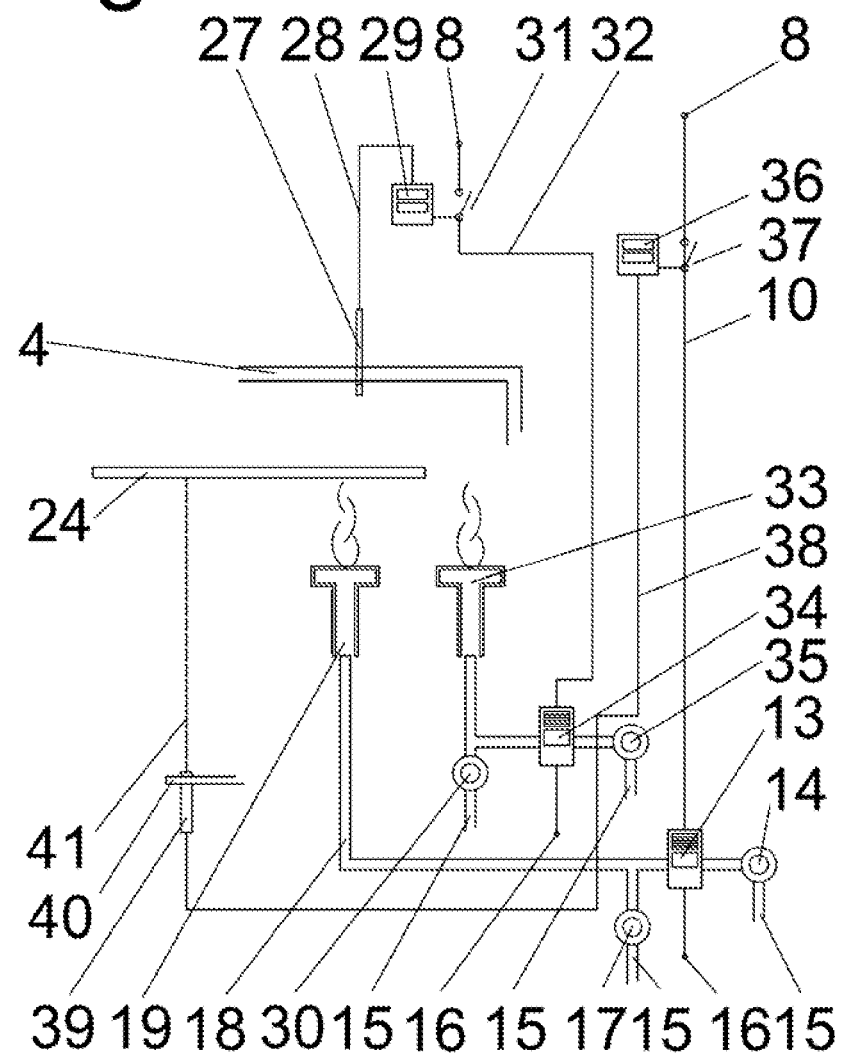
FIG. 18 is a right-side schematic cut away view of an embodiment of the current invention without top surface oven floor temperature sensing and regulation. The temperature regulation of the floor is done by sensing regulation and control of the floor bottom surface. The baking chamber is independently temperature sensed, regulated and heated. There is no underfloor chamber for this system. The oven may be of any size.

FIG. 18 is the oven of FIG. 8, but IR sensing of the top of the oven floor, and the controller for the top surface temperature of the oven floor is removed. Control of oven floor temperature is done using only infrared light measurements from the bottom of the floor. It is included here in the theme of oven temperature control systems using infrared sensors to measure the floor surface temperatures of high temperature pizza ovens.

Though less practical, infrared light emissions from the side surface of a rotating oven floor can be measured to provide signal to a temperature controller switching a relay that can power, signal or otherwise control a heating system for the floor. The relay can be used alone or in series with one or both relays operated by controllers receiving signals from IR sensors targeting the top and bottom surfaces of the oven floor.

Various Embodiments of the Present Invention

Figure 3:
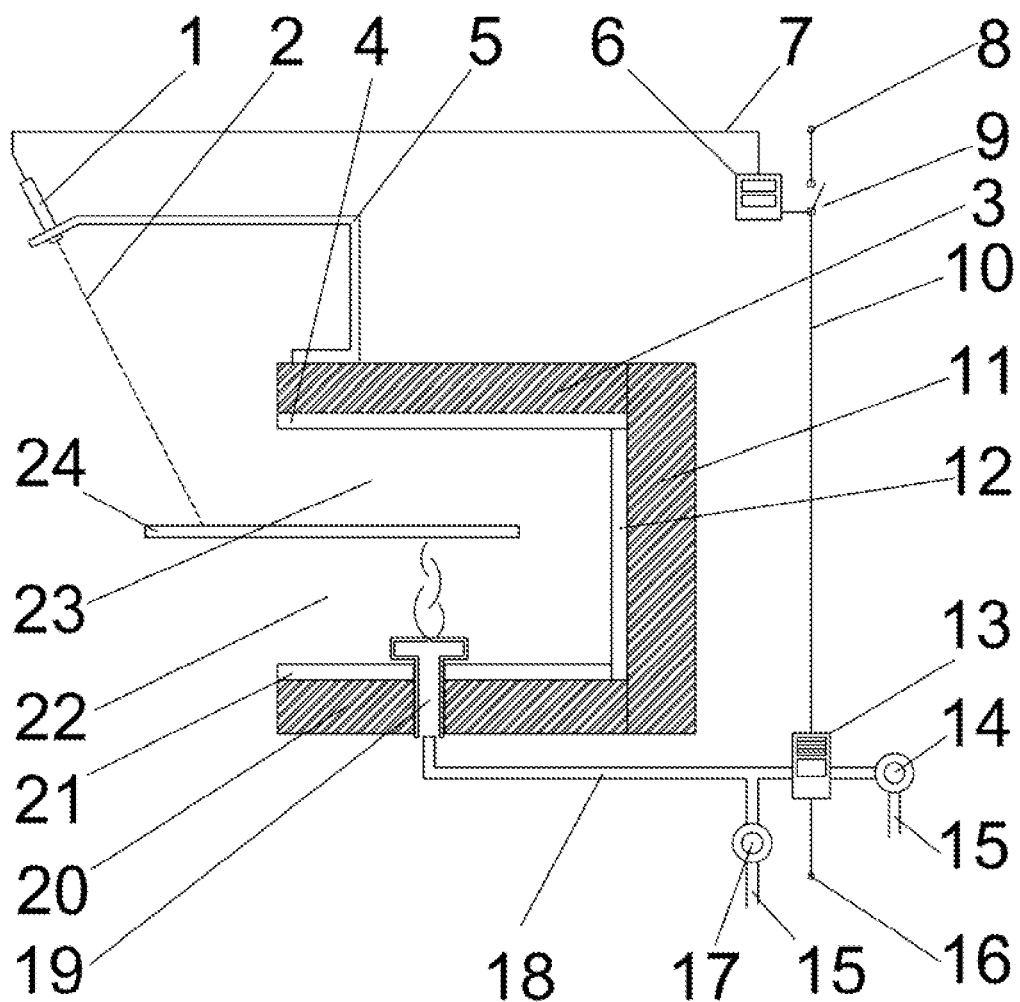
FIG. 3 is a right-side schematic cut away view of a simple embodiment of the ovens of the instant invention. The front of the oven is on the left.

FIG. 3 is a right-side cutaway schematic drawing of a simple embodiment of a preferred embodiment of the present invention. The front of the oven is on the left. The oven floor top surface infrared sensing apparatus of FIG. 1 is shown using the oven temperature control system of FIG. 2 in a simple oven shell comprising the structural top of the baking chamber or "dome" 4 covered by insulation layer 3. Structural dome 4 is supported by oven walls 12 on three sides and backed by wall insulation 11. There is a structural wall that contains the insulation (not shown). The oven floor 24 may be fixed or moving or rotating about an axis on a mechanical device to provide support and rotation. The area above floor 24 and below dome 4 forms the baking chamber 23. Burner 19 rests on the bottom of the burner box 21. The area between the bottom of the burner box 21 and the oven floor 24 forms an underfloor area 22. This area may contain structural boundaries, fixed and or moving with a rotating oven floor, as well as baffles fixed and or moving to direct heat to the bottom surface of the oven floor 24 and baking chamber 23. Moving baffles and moving burners or other architecture may or may not allow for adjustment of the heat supply to the baking chamber. A layer of insulation 20 is provided under the bottom of the burner box.

Figure 6:
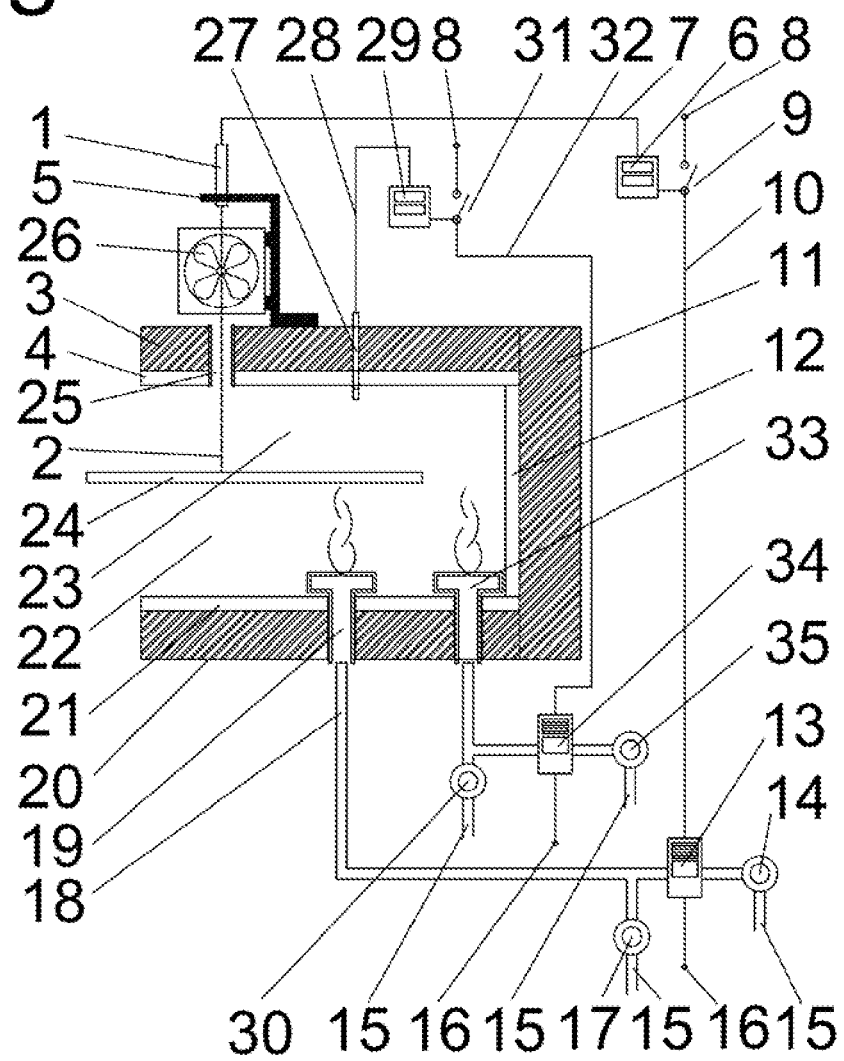
FIG. 6 is a right-side schematic cut away view of an oven embodiment that uses forced air to defend the infrared sensor from hot gas rising through an open port and uses a control system with independent temperature regulation systems for the dome and baking chamber.

FIG. 6 is a right-side cutaway schematic drawing, front of the oven to the left, showing the oven floor top surface infrared sensing apparatus of FIG. 4 used with the control system of FIG. 5. This oven has a port 25 that traverses insulation layer 3 and structural dome 4. This allows the sensor apparatus to be closer to the oven chamber 23 and recessed back from the front of the oven in a more convenient location for baking operation. Please note that separate burners for ramp and soak fuel supplies for both dome and floor may be used with or without pilot burners.

Figure 9:
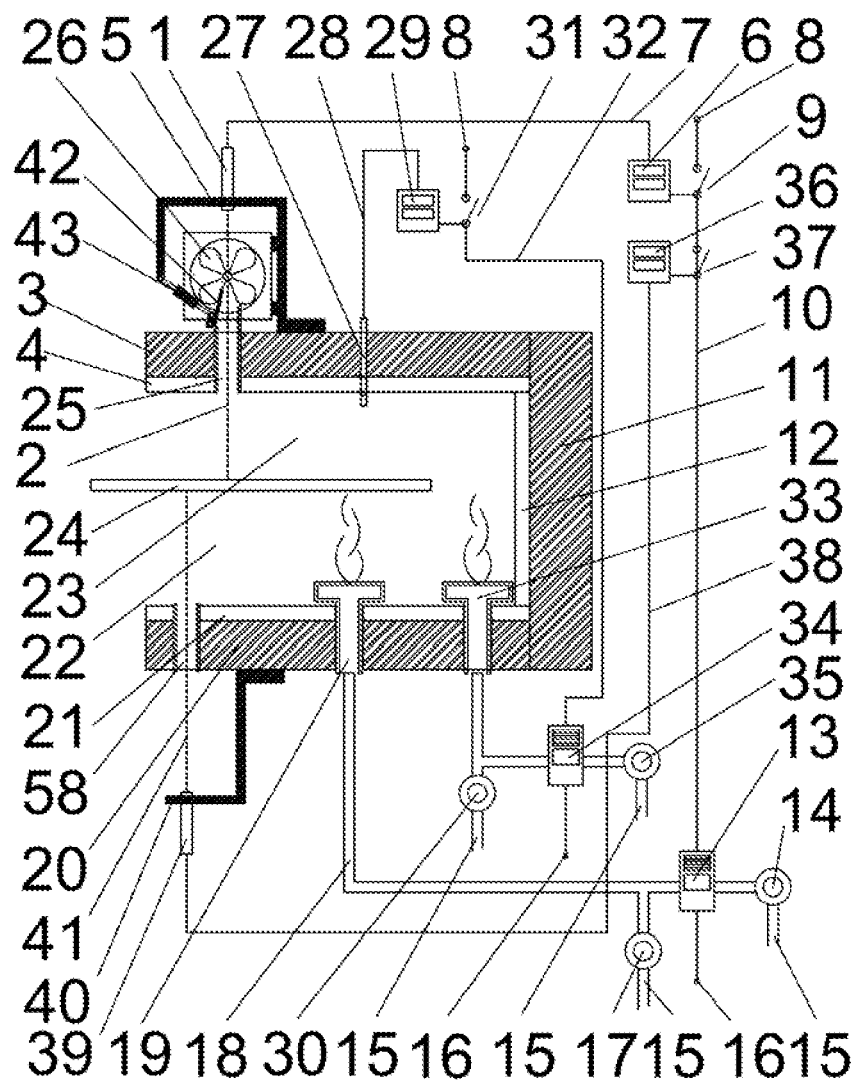
FIG. 9 is a right-side schematic cut away view of an embodiment of an oven of this invention using forced air and a shutter to defend the top floor IR sensor from hot gas from the baking chamber, as well as independent burners and control systems for the baking chamber and floor. Infrared sensing of the top and bottom of the oven floor allows controller relays to be arranged in series to power a burner dedicated to heating the oven floor. In this oven, temperature limits can be set for the top and bottom surfaces of the oven floor as well as the oven baking chamber.

FIG. 9 is a right-side cutaway schematic drawing, front of the oven to the left, showing the oven floor top surface infrared sensing apparatus of FIG. 7 used with the control system of FIG. 8. New to the structure of this oven is a port traversing the underfloor insulation layer 20 and the bottom of the burner box 21.

Figure 11:
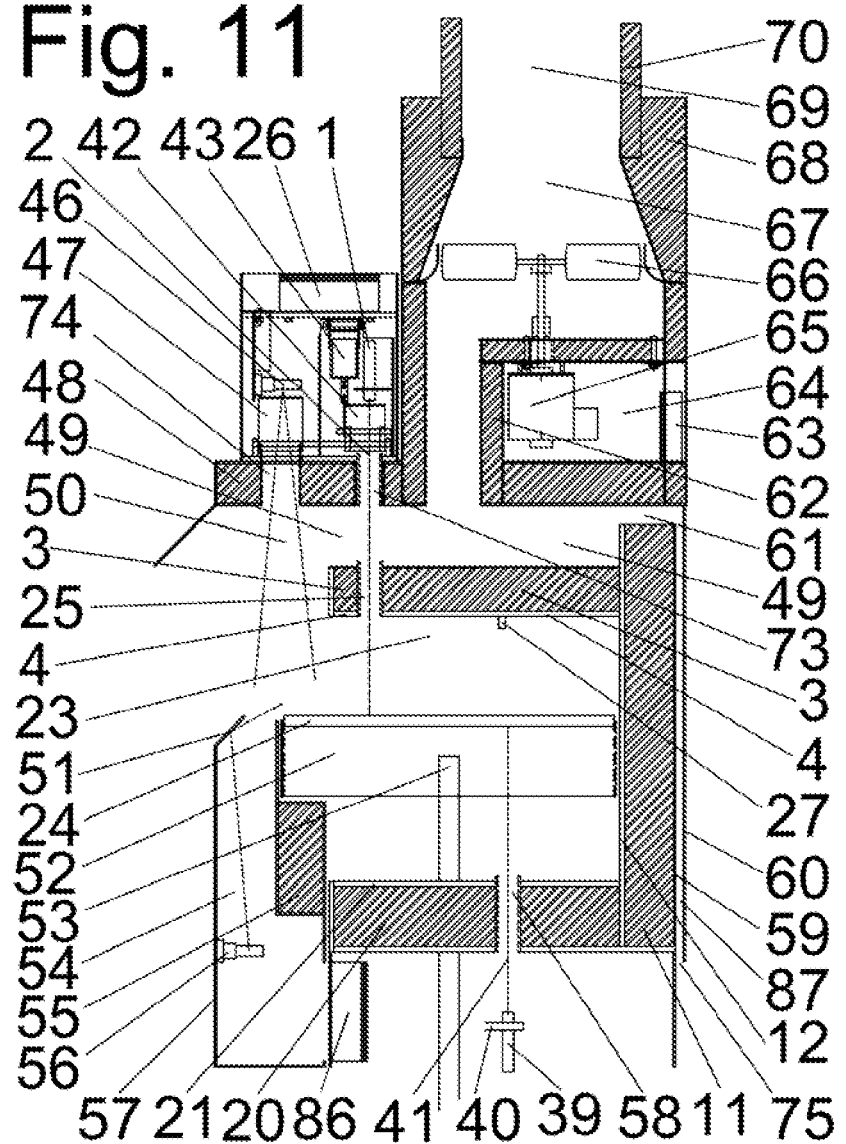
FIG. 11 is a right-side schematic cut away view of an oven of the instant invention with powered ventilation and a hood. One of the IR sensors shown reads the top surface temperature of the oven floor through two ports, one port in the top of the insulated hood vent, and one port in the top of the baking chamber and the insulation above it. A pressurized chamber contains the IR sensor and a light source, both protected by powered ventilation and shutters. An exhaust fan is shown in an insulated compartment, with the fan motor ventilated by a dedicated fan forcing cool air into the motor box. A system for ventilating a space between the outside surface of the oven and the insulation chamber on the sides and back of the oven is shown. A system for ventilation of an insulated oven door, as well as a light source in the door, protected by powered ventilation, and located outside of and under the baking chamber is shown.

FIG. 11 is a right-side cutaway schematic drawing, front of the oven to the left, showing the oven floor top surface infrared sensing apparatus of FIG. 10 used with the control system of FIG. 8.

This oven is shown with a ventilation system comprising fan blades 66 in insulated housing 68 blowing exhaust gas up flue 69 with insulated wall 70. The exhaust fan motor 65 is contained in an insulated fan motor housing 64 constructed with insulated walls 62 on all sides ventilated by motor housing ventilation fan 63. Rotating fan blades 66 create negative pressure in vent 49. This causes hot air rising out of baking chamber 23, past the front of the structural dome 4 in front of and above insulation layer 3 to be removed through flue 69.

Negative pressure in the vent 49 also allows negative pressure in an area 61 over the top of the oven wall insulation layer 11, allowing air to be sucked up from an oven covering vent space 58, between the exterior covering of the oven 60 and the outside of the insulation wall 59. A negative pressure area 75 allows air to enter the space 58 between the outside of the insulation wall 59 and the inside of the exterior oven covering 60. In this way the outside covering of the oven is ventilated.

In a similar way, the oven door is ventilated by fan 86 pushing air into an area between insulation in the door 55 and the exterior covering of the door 57 to keep it cool. A light source 56 is arranged outside of and under the baking chamber and inside of the door so that light will reflect off a reflecting lip 51 at the top of the door, and onto the bottom of food being baked. The door only covers the front opening of the oven from the top surface of the oven floor and lower.

The infrared sensing axis 2 now passes through the sensing apparatus chamber, past the shutter, through port 73 (traversing the top of the insulated vent wall 48), the vent 49 itself, port 25 (traversing the dome insulation layer 3), the structural dome 4 and the baking chamber, before ending at the surface of the oven floor.

Additional complexities shown here include a light source 46 contained in the closed pressurized housing of the top oven floor IR sensor apparatus. Fan 26 is shown at the top of the structure for the sensing apparatus. Port 74 traverses an insulated vent wall 48 allowing light 50 to shine down to the top of the oven floor 24 below, as the light source 46 is defended from hot exhaust gas rising through the port 74 by powered ventilation from fan 26. In the event of a power failure, the solenoid actuator 43 holding shutter 47 open will fail to be powered and cause the shutter to close over port 74 preventing hot rising gas from the oven chamber 23 from damaging the light source 46. The light source is protected from heat damage using the same mechanisms that are used to defend the IR sensor. Backup power systems for fan 26 using a battery and charger are not shown.

Note should be made that IR sensor 39 may be defended by shutters and fans with or without back up power supplies with battery and charger.

Figure 12:
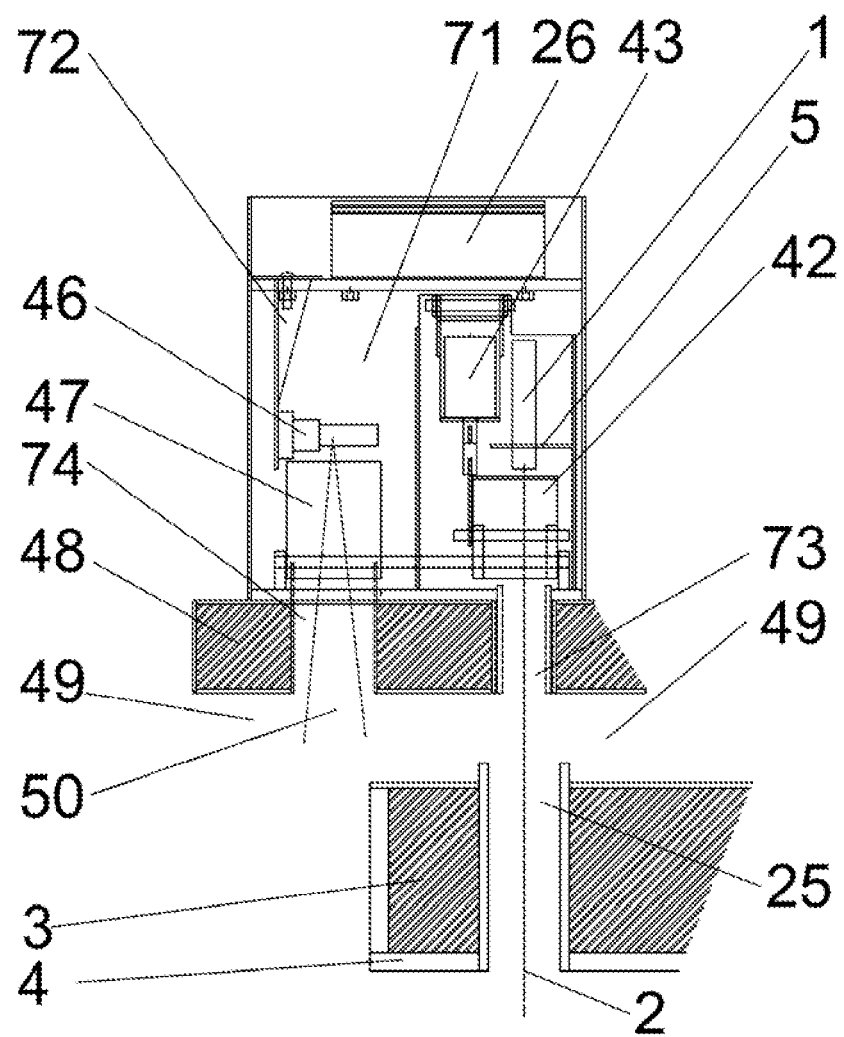
FIG. 12 is a right-side schematic cut away view of a light source and an IR Sensor in a top surface oven floor sensor apparatus. Both are protected by a pressurized chamber over ports for light and IR sensing. Ports in the insulated hood vent top and the insulated top of the baking chamber are shown.

FIG. 12 is a detail of an embodiment of an oven floor top surface IR sensing light source apparatus of the current invention. Top surface oven floor light source 46 is shown attached to light bracket 72, inside closed chamber 71, pressurized by sensor cooling fan 26, which forces air down ports 73 and 74 as they traverse vent insulation layer 48 to keep sensor 1 cool as it is mounted on bracket 5. Shutters 42 and 47 are moved by solenoid actuator 43, closing in the event of primary power failure. Light 50 shines from light source 46 to the top surface of the oven floor. The infrared sensing axis 2 now preferably passes through the sensing apparatus chamber, past the shutter, through port 73 (traversing the top of the insulated vent wall 48), the vent 49 itself, port 25 (traversing the dome insulation layer 3), the structural dome 4 and the baking chamber, before ending at the surface of the oven floor.

Figure 13:
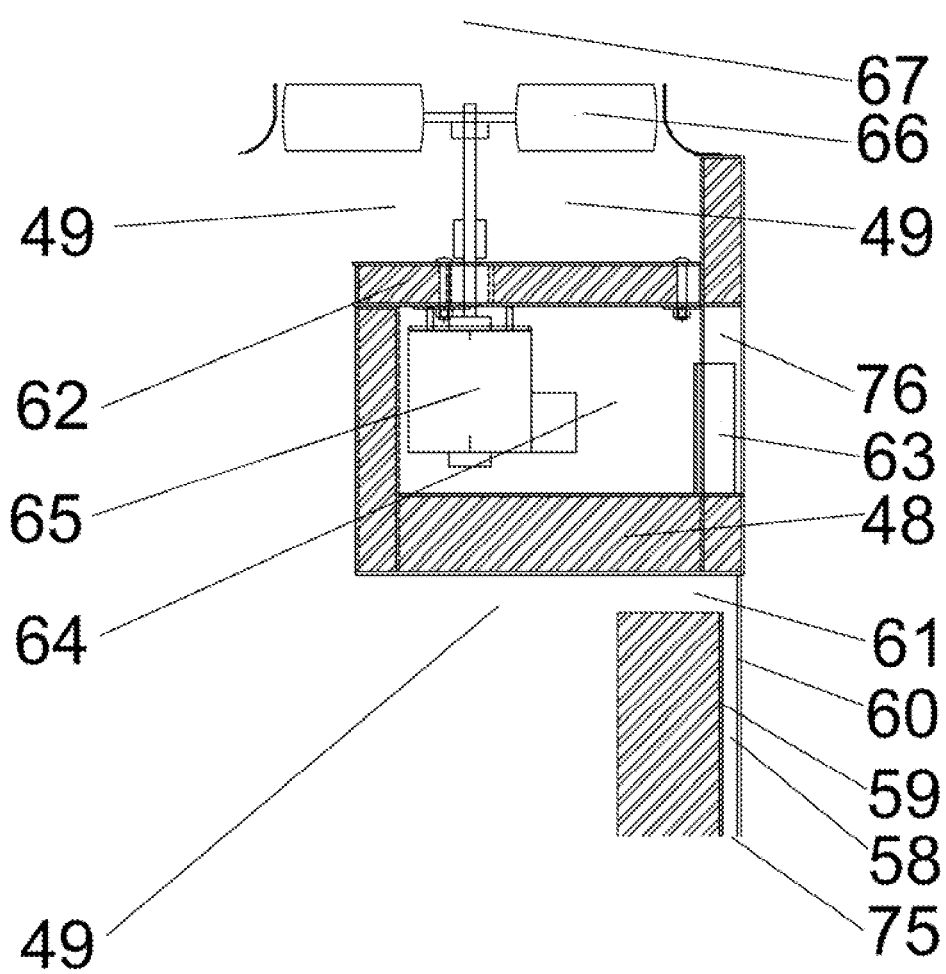
FIG. 13 is a right-side schematic cut away view of an exhaust fan motor in an insulated chamber with a ventilation fan for cooling the chamber.

FIG. 13 is a close-up right-side cutaway schematic drawing of the ventilated and insulated fan motor chamber 64. The exhaust fan motor 65 is preferably contained in an insulated fan motor housing 64 constructed with insulated walls 62 on all sides ventilated by motor housing ventilation fan 63. Rotating exhaust fan blades 66 create negative pressure in vent 49. Negative pressure in the vent 49 also allows negative pressure in an area 61 over the top of the oven wall insulation layer 11, allowing air to be vacuumed through an oven covering vent space 58, formed between the exterior covering of the oven 60 and the outside of the insulation wall 59. A negative pressure area 75 allows air to enter the space 58 between the outside of the insulation wall 59 and the inside of the exterior oven covering 60. In this way the outside covering of the oven is ventilated using the exhaust vent hood system.

Figure 14:
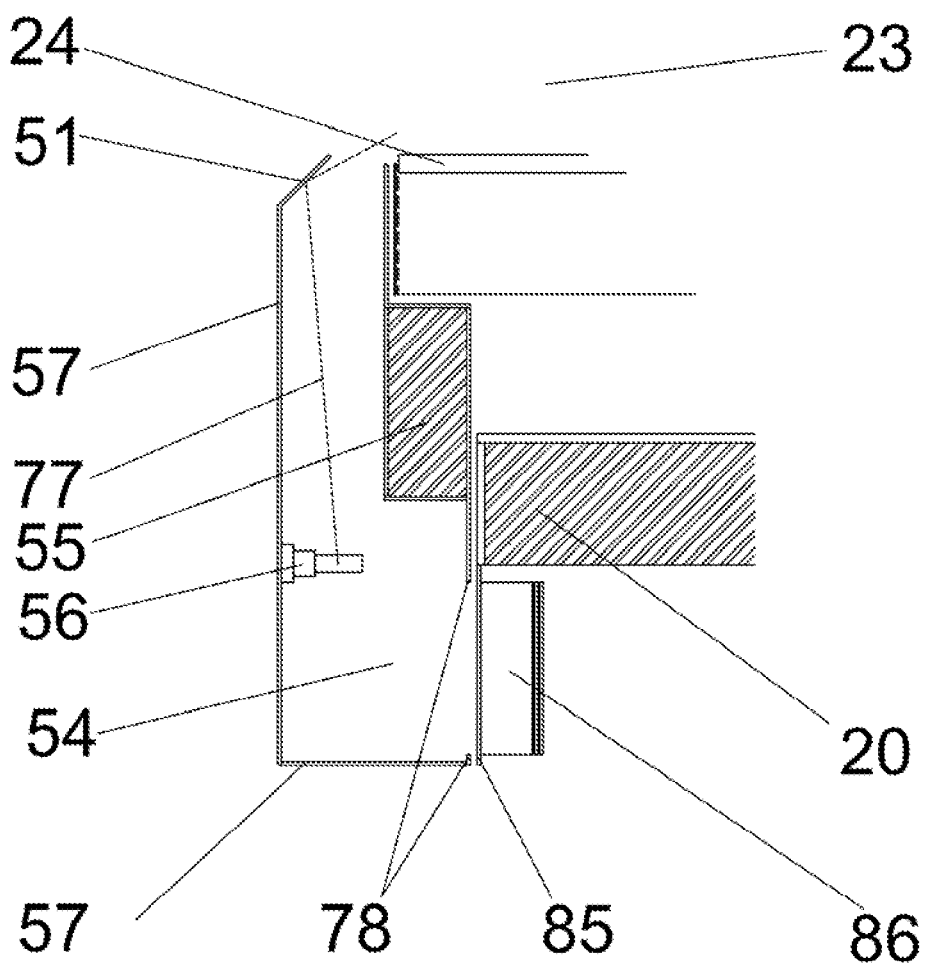
FIG. 14 is a right-side schematic cut away view of an oven door that closes over the front of the oven under the top surface of the baking chamber floor. It is shown in the closed position, demonstrating a fan inside the oven, under the bottom insulation layer, blowing cool air from under the oven, through a port into a chamber providing ventilation between the door insulation and the outer covering. The chamber contains a light source located outside of and under the baking chamber, that shines up to reflect light off an upper rim, shining onto the bottom of the food being baked in the baking chamber.

FIG. 14 is a close-up cutaway right side schematic view of a preferred embodiment of the oven door. The oven door is ventilated by fan 86 mounted under the oven, under the underfloor insulation layer 20, pushing air through a port or opening in the door 78 into an area 54 between insulation in the door 55 and the exterior covering of the door 57 to keep it cool. A light source 56 is arranged outside of and under the baking chamber 23 inside of the door so that light 77 will reflect off a reflecting lip 51 at the top of the door, and onto the bottom of food being baked on top of the oven floor 24. The door preferably only covers the front opening of the oven from the top surface of the oven floor and lower. The baking chamber 23 is open above the door.

FIG. 15 is a right side cutaway schematic drawing of an oven ventilation system that uses the negative pressure in vent 49, just underneath fan blades 66 to lift a metal flap 82 that pulls a flue cap linkage 81 to open a flue cap 80 allowing sensor chamber 84 to be ventilated by the exhaust vent 49 negative pressure. Cool fresh air source 75 allows cool air to flow past sensor 1. A shutter linkage 79 allows the mechanism to open the shutter 42 so that sensing can occur through ports 73 and 25. Also shown is an electrode 79 in contact with the grounded shutter providing a closed circuit to verify effective ventilation and change of state by the control module for ignition.

Figure 19:
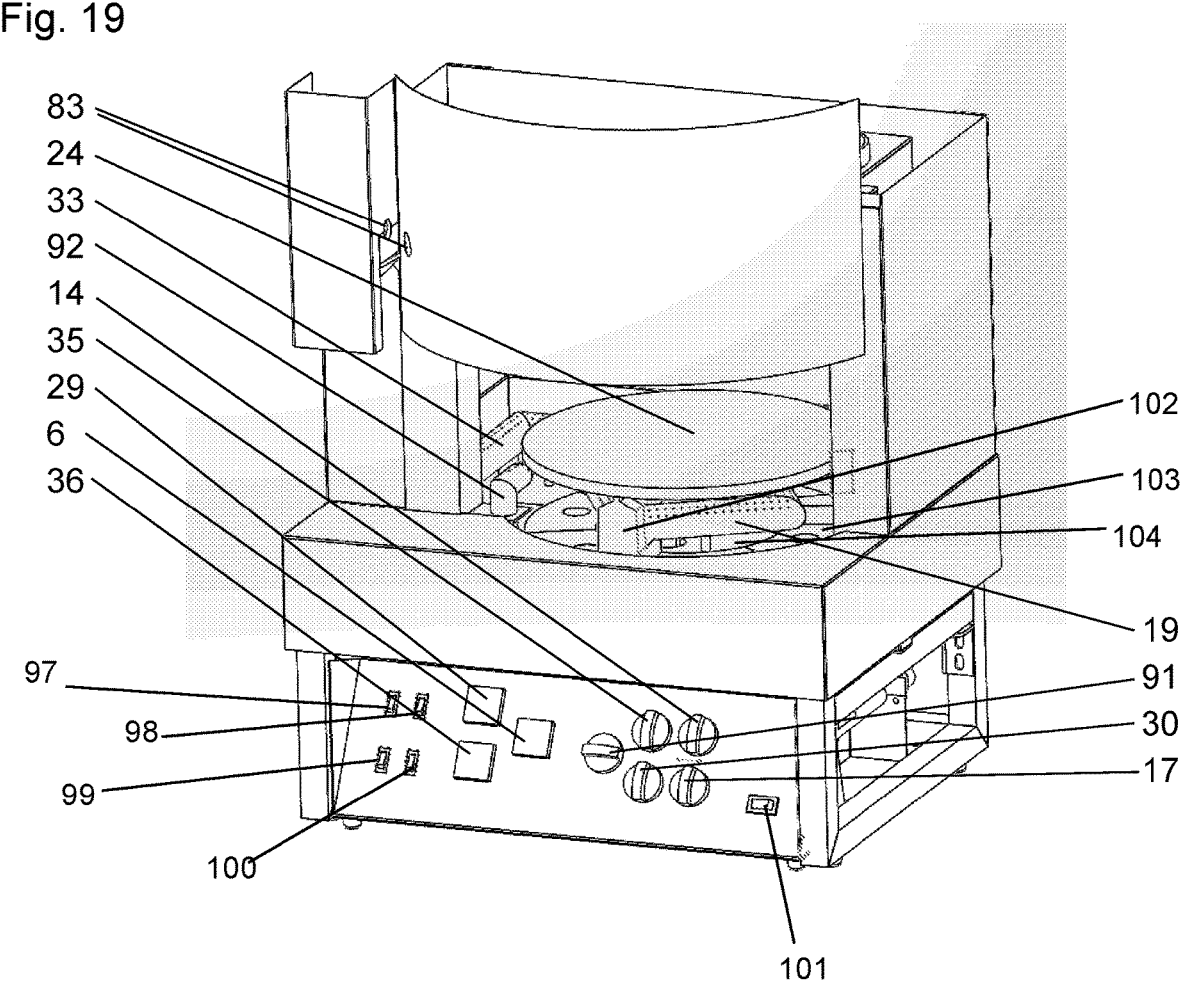
FIG. 19 is a three-dimensional front view of an embodiment of the present invention.

FIG. 19 is a three dimensional front view of a countertop drum oven showing floor plate 24 on top of a carousel support structure that rotates on a perimeter or "Lazy Susan" bearing, about a central fixed platform supporting floor burner 19. Part 92 is a pilot burner that is ignited manually and adjusted using pilot gas valve 91. Controller 29 sets temperature limits in the baking chamber by sensing a thermocouple at the top the baking chamber and switching a relay off and on to open and close a solenoid valve that supplies fuel to burner 33 during the ramp segment of the heating cycle causing heat gain at the dome in the baking chamber. The additional fuel supply to the burner during ramping is adjustable using valve 35. Gas valve 30 controls a fixed supply of gas to burner 33 for heating during the soak cycle of the oven chamber when the solenoid valve is closed. It can be set so that the oven chamber loses temperature slowly during the soak cycle. Controller 6 senses the IR sensor 1 (see FIG. 20 for IR sensor 1) measuring IR light from the top of the oven floor 24, and controls a relay arranged in series with the relay of controller 36 which senses the IR sensor measuring light emissions from the bottom of the oven floor. When the relays are closed on both Controller 6 and 36 the solenoid valve for burner 19 opens and the ramp fuel supply, adjustable using valve 14 is delivered to the burner. When the solenoid valve is closed, burner 19 is supplied by a constant fuel supply, adjustable using valve 17, so that the floor looses heat slowly during the soak segment of the bake cycle. Baffle/shutter linkage 83 protects IR sensor 1 (see FIG. 20) from the oven's heat.

Figure 20:
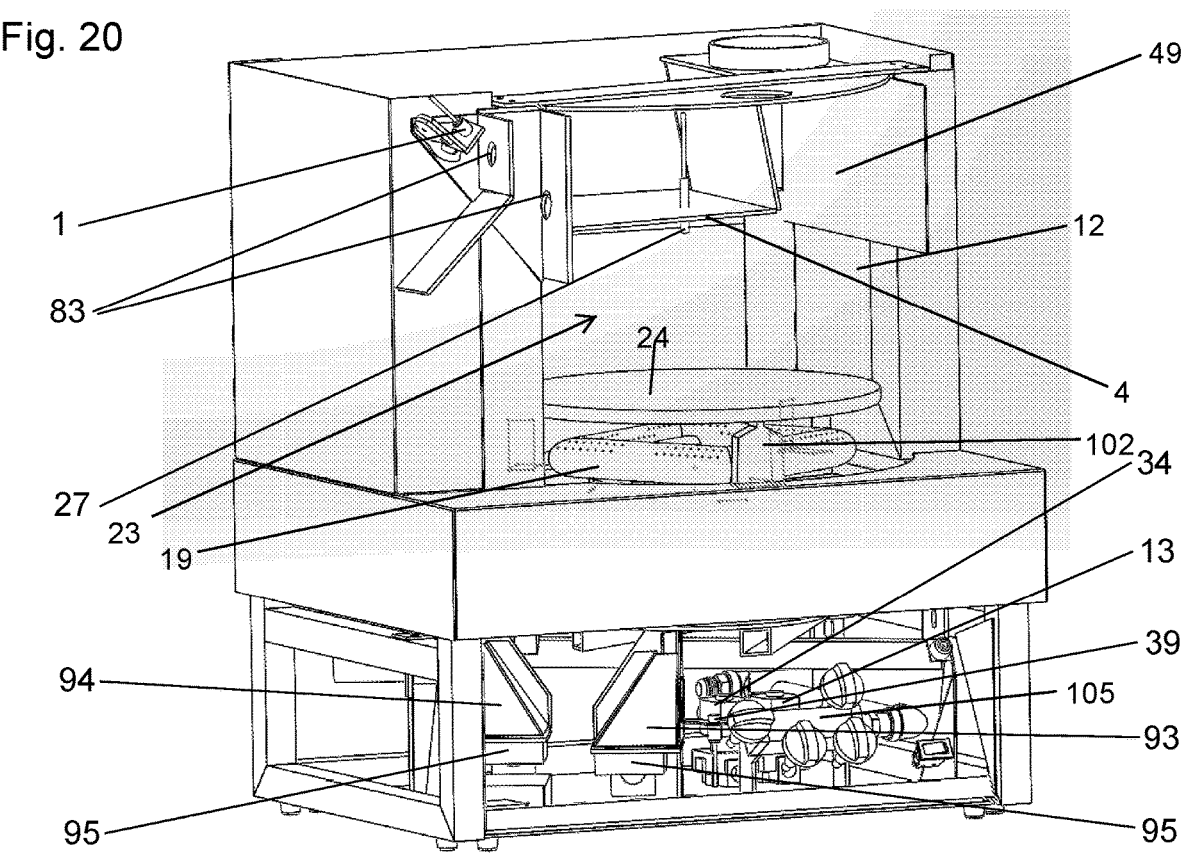
FIG. 20 is a three-dimensional cut away view of an embodiment of the present invention.

FIG. 20 is a three-dimensional cut away showing the position of IR sensor 1 measuring IR light emissions from the oven floor through baffles 83. Also shown is thermocouple 27 sensing the temperature at the top of the baking chamber. IR sensor 39 senses light emissions from the bottom of the oven floor plate. Solenoid valve 13 opens to control the fuel supply to the burner under the oven floor during the ramp segment of the floor heating cycle. Solenoid valve 34 opens to control the fuel supply to the oven chamber burner during the ramp portion of the oven chamber heating cycle. Fan 95 blows air into forced air duct 94, providing forced air to the dome burner, and fan 96 blows forced air duct 93, providing forced air to the oven floor burner, to prevent burner fires.

Throughout this application, reference is at times made to high temperature pizza ovens. Although the control systems and sensing apparatus were developed primarily for use with high temperature pizza ovens, such systems and apparatuses are not limited to use with high temperature pizza ovens and can be utilized with ovens incapable of reaching the high temperatures required for Italian pizza and can be utilized with ovens which are not designed for baking pizza. Thus, the references to high temperature pizza ovens are provided by way of example and not in any way limiting the present invention to such application.

Parts List:

The following is a list of parts and materials suitable for use in the present invention. The brand name parts are examples only. Similar substitutes can be utilized in their place, if available. The specific ones mentioned are simply an example which may be utilized Parts Number Description 1 Infrared sensor reading the top surface of the oven floor. For example, one could utilize the CSmi-SF15-C3/05 by Micro-Epsilon (available at Micro Epsilon America-8120 Brownleigh Dr. Raleigh, N.C.,27617

2 Central axis of sensing field of floor top surface infrared sensor. In various embodiments, the sensor may be, for example, 4-54 inches from target. For example, the sensor may be around 14 inches from the target.

3 Insulation layer contained in a structure arranged over the material comprising the structure of the top of the baking chamber or dome. The insulation may be of those materials known to one in the art, such as rock wool, stone wool, mineral wool, fiberglass, ceramic fiber, vermiculite, or pearlite, though the insulation is preferably mineral wool, with a thickness preferably 0.5 to 6 inches, for b example 3 inches. Confinement: metal sheet, usually stainless steel, preferably 0.018 to 0.1 inches, for example 0.06 inches.

4 Material structure forming the dome or the top of the baking chamber. The material may be made out of stainless steel or aluminum sheet or plate, preferably 0.08 inches to 0.5 inches thick, preferably stainless steel, for example 0.25 inches thick. May also be refractory materials preferably 0.5-4 inches thick. Suitable materials are available from Plicast Hymor KK, TFL Houston, 14626 Chrisman, Houston, Tex., 77039. The dome or top of the baking chamber is preferably 1-6 feet in width and depth, for example 22×14 inches.

Mounting bracket for the infrared sensor. The mounting bracket may comprise metal, aluminum, stainless steel, 0.04 to 0.1 inches preferably, for example .06 thickness. The bracket may be sized to hold sensor in position (preferably 4-54 inches away from the oven floor).

6 Oven floor top surface temperature controller. For example, one may utilize Model 16-B Dwyer-Love 102 Indiana Hwy 212, Michigan City, Ind. 46360

7 Positive signal line connecting floor top surface infrared sensor to floor top surface temperature controller.

8 Positive or line power supply.

9 Oven floor top surface temperature controller relay. In various embodiments, the controller relay can be built into the controller 6 during fabrication.

10 Positive or Line power supply to solenoid valve for floor burner.

11 Insulation layer outside of the structure of the oven walls, contained in a structure providing a physical boundary for insulation material. The insulation may comprise: rock wool, stone wool, mineral wool, fiberglass, ceramic fiber, vermiculite, pearlite, preferably mineral wool, preferably thickness 0.5 to 6 inches, for example 3 inches. Confinement: metal sheet, usually stainless steel, preferably 0.018 to 0.1 inches, for example 0.06 inches.

12 Oven wall/oven wall structure. Metal, mild steel, stainless steel or aluminum sheet or plate, preferably .08 inches to 0.5 inches thick, preferably stainless steel, 0.5 inches thick for example. May also be refractory materials like Plicast Hymor KK, TFL Houston, 14626 Chrisman, Houston, Tex., 77039. 0.5 inches to 3 inches in thickness, preferably.

13 Solenoid gas valve that opens to provide ramping fuel supply for floor burner. Asco Red Hat Gas Valve 8210H106, supplied by Grainger Industries, 601 S. Galvez St., New Orleans, LA, 70119.

14 Manual gas valve, with needle, ball, or other mechanism to allow regulation of gas flow to the floor burner when solenoid valve opens during ramping.

15 Gas fuel supply source.

16 Negative or common electrical power line. For example, 14-18 gauge insulated stranded copper wire.

17 Manual gas valve, with needle, ball, or other mechanism to allow regulation of a constant gas flow to the floor burner during soaking 18 Common fuel line to floor burner receiving fuel supplies for ramping and soaking.

19 Burner/Heat Source for heating the floor. Preferably fabricated from stainless steel (for example, 1.5-inch stainless steel pipe).

20 Insulation layer under bottom of burner box contained in a physical structure. Insulation may comprise: rock wool, stone wool, mineral wool, fiberglass, ceramic fiber, vermiculite, and/or pearlite, but is preferably mineral wool, thickness 0.5 to 6 inches preferably, for example 3 inches. Confinement: metal sheet, usually stainless steel, preferably 0.018 to 0.1 inches, for example 0.06 inches.

21 Bottom of burner box. Metal, mild steel, stainless steel or aluminum sheet or plate, preferably 0.08 inches to 0.5 inches thick, preferably stainless steel, preferably 0.5 inches thick. May also be refractory materials like Plicast Hymor KK, TFL Houston, 14626 Chrisman, Houston, Tex., 77039. Preferably 0.5 Inches to 3 inches in thickness.

22 Underfloor area bounded at the top by the bottom surface of the oven floor and at the bottom by the bottom of the burner box (area of oven containing the burners). Preferably 3 to 18 inches in height, for example 8 inches high, preferably 1 to 6 feet wide and deep, for example 23 inches wide and 13 inches deep.

23 Baking chamber/oven chamber. Preferably 1 to 6 feet wide and deep, for example approximately 23 inches wide and 14 inches deep.

24 Oven floor. Can be obtained from Plicast Hymor KK, TFL Houston, 14626 Chrisman, Houston, Tex., 77039. Preferably 0.5 Inches to 3 inches in thickness, 1 to 6 feet wide and 0.1 to 4 inches thick, for example 16.5 inches wide and 0.6 inches thick. In some applications may be metal, or screen or grate.

25 Dome infrared sensing port. Stainless steel pipe or tubing. May be other metal. 0.075 inches ID up to 4 inches ID preferably, for example 1.25 inches ID 26 IR sensor fan. For example, can be Sanyo Denki San Ace 120 24 VDC 1500 Wyatt Dr. St 5, Santa Clara Calif. 95054

27 Dome thermocouple. For example, can be J-1 Thermocouple, Thermometrics Corp. 18714 Parthenia St., Northridge CA, 91324

28 Positive control line for thermocouple

29 Oven temperature controller for dome. For example, Model 16-B Dwyer-Love 102 Indiana Hwy 212, Michigan City, Ind. 46360

30 Manual needle, ball valve or other manual mechanism adjusting soak fuel supply for dome burner.

31 Relay controlled by dome oven temperature controller.

32 Positive power line for dome burner solenoid gas valve.

33 Dome burner/Dome heat source. Fabricated from 1.5-inch ID stainless steel pipe.

34 Dome solenoid gas valve. Opens to provide fuel for ramping. For example, Asco Red Hat Gas Valve 8210H106, supplied by Grainger Industries, 601 S. Galvez St., New Orleans, LA, 70119.

35 Manual needle, ball valve or other manual mechanism adjusting ramp fuel supply for dome burner.

36 Oven temperature controller for bottom surface infrared sensor. For example, Model 16-B Dwyer-Love 102 Indiana Hwy 212, Michigan City, Ind. 46360

37 Relay for oven temperature controller for bottom surface infrared sensor. Built into controller.

38 Positive signal line from infrared sensor measuring oven floor bottom surface infrared light emission. For example, may be fabricated as part of sensor.

39 Infrared sensor measuring oven floor bottom surface infrared light emission. For example, CSmi-SF15-C3/05 Micro-Epsilon 8120 Brownleigh Dr. Raleigh, N.C.,27617

40 Bracket holding bottom surface oven floor infrared sensor. For example, Stainless Steel Sheet, for example 0.030 in. -0.060 in.

41 Axis of sensing field of bottom surface oven floor infrared sensor. Sensor may be 3-48 inches from target. For example, it may be about 14 inches from target.

42 Shutter over dome port. The shutter may be, for example, fabricated from stainless steel. In one prototype, the shutter was fabricated from 101-inch-thick sheet stainless steel.

43 Solenoid linear actuator. For example, Guardian Electric MPN T12X19-C-24 VDC, Supplied by Online Components 2425 S. 21'. St. Phoenix, Ariz. 85034

44 Interior port sleeve attached to top floor IR sensing apparatus. Stainless steel tubing or pipe. For example, it can be about 1.5 Outer Diameter (OD).

45 Outside port sleeve attached to dome and insulation layer. For example, it can be about 1.5 in. Inner Diameter. (ID)

46 Oven floor top surface light source. For example, one could utilize 1000 Lumen LED WM Life Flashlight Bulb, LED smoot Reflector T-6 Single Mode supplied by Amazon.com.

47 Shutter for oven floor top surface light source. May be fabricated out of stainless-steel sheet, 0.101 inches thickness, for example.

48 Insulation in hood vent top contained in physical structure. Insulation may comprise: rock wool, stone wool, mineral wool, fiberglass, ceramic fiber, vermiculite, and/or pearlite, preferably mineral wool, preferable thickness 0.5 to 6 inches, for example 2 inches. Confinement: metal sheet, usually stainless steel, preferably 0.018 to 0.1 inches, for example 0.06 inches.

49 Vent chamber

50 Light for illumination shining to top of oven floor.

51 Reflecting lip/Reflection area on upper lip of oven door. May comprise polished stainless-steel sheet. Preferably 0.018 to 0.1 inches, for example 0.06 inches thick.

52 Perimeter containment wall for area under oven floor. For example, 0.101 Stainless Steel Sheet, rolled to shape of cylinder forming side boundaries of underfloor chamber. May comprise stainless steel or mild steel, preferably 0.018 to 0.25 inches thick, for example 0.101 inches thick.

53 Rotating axle supporting oven floor. Provides support of oven floor, Perimeter Containment Wall and Radial Plates welded between Perimeter Containment Wall and Axle. May comprise tainless steel round bar, preferably 0.25 to 1.5 inches Outer Diameter, for example 1 inch Outer Diameter 54 Ventilated area between oven door insulation wall and exterior structural boundary of oven door. Preferably 0.25-2 inches, for example 1 inch.

55 Oven door insulation in structural containment. Insulation may comprise: rock wool, stone wool, mineral wool, fiberglass, ceramic fiber, vermiculite, and/or pearlite, preferably mineral wool, thickness preferably 0.5 to 6 inches, for example 2 inches. Confinement may be: metal sheet, usually stainless steel, preferably 0.018 to 0.1 inches, for example 0.06 inches.

56 Oven door light source. For example, can utilize 1000 Lumen LED WMLife Flashlight Bulb, LED smoot Reflector T-6 Single Mode. Supplied by Amazon.com.

57 Exterior boundary structure of oven door. May be made of stainless steel sheet, preferably 0.018-0.12 inches, for example 0.060 inches thick.

58 Vent space/Port traversing bottom of burner box and insulation layer. May be made of stainless steel pipe. May be about 1.25 inches ID 59 Outside structural confinement of oven wall insulation layer 60 Structure of oven exterior surface/exterior covering of oven. Preferably 0.018-0.075 inches, in various embodiments about 0.06 inches in thickness.

61 Negative pressure area in vent and over oven wall and insulation layer. Preferably 1-6 inches, for example 3 inches.

62 Insulation layer and structural confinement around exhaust fan motor chamber. Insulation may comprise rock wool, stone wool, mineral wool, fiberglass, ceramic fiber, vermiculite, and/or pearlite, preferably mineral wool, thickness preferably 0.5 to 4 inches, for example 2 inches. Confinement may be: metal sheet, usually stainless steel, preferably 0.018 to 0.1 inches, for example 0.06 inches.

63 Exhaust fan motor chamber ventilation fan. For example, Sanyo Denki San Ace 80 L 24 VDC. 1500 Wyatt Dr. St 5, Santa Clara Calif. 95054

64 Exhaust fan motor chamber/housing. For example, 6x9x5 inches.

65 Vent Exhaust fan motor. For example, Dayton Exhaust Fan, 10-inch, 1/30 horsepower. Supplied by Grainger 601 S. Galvez, New Orleans, LA 70119.

66 Exhaust fan motor blades. May be fabricated as part of fan, see part 65.

67 Positive pressurized ventilated area inside vent exhaust fan housing. Air is forced into this area by the fan, causing air to move up through flue pipe.

68 Vent exhaust fan housing with insulation.

69 flue/pressurized lumen of flue duct. For example, 4-6 inches in diameter.

70 Insulated wall/Insulation inside structure of vent flue duct. Insulation may comprise: rock wool, stone wool, mineral wool, fiberglass, ceramic fiber, vermiculite, and/or pearlite, preferably mineral wool, thickness preferably 0.5 to 4 inches, for example 2 inches. Confinement: metal sheet, usually stainless steel, preferably 0.018 to 0.1 inches, for example 0.06 inches.

71 Closed chamber/Pressurized chamber containing top floor surface IR sensor, light source, and solenoid. May be made of stainless steel sheet. 0.018-0.1 inches thick preferably, in various embodiments 0.075 inches thick.

72 Bracket holding top floor surface illumination light source. Sheet metal, for example stainless steel, mild steel, aluminum sheet. 0.018-0.101 inches thick preferably, for example 0.075 inches thick. 73 Port traversing exhaust vent top insulation layer in structural confinement for top floor surface IR sensing field. May be stainless steel pipe or tubing. May be about 1 inch ID.

74 Port traversing exhaust vent top insulation layer in structural confinement for top floor surface light. May be stainless steel pipe or tubing. May be about 1.5 inches ID.

75 Cool fresh air source/negative pressure area/Cool room air vacuumed into negative pressure area for ventilation.

76 Opening in vent exhaust fan motor chamber allowing flow of air out of chamber once it has been heated by cooling the fan motor. May be an opening, for example, 6×5 inches. This space allows cool air forced into the exhaust fan motor chamber for cooling the motor, to leave the chamber, and port out of chamber once it has been heated as it cooled the motor.

77 Light in oven door.

78 Port/opening in oven door receiving forced air for ventilation. For example, may be about 4 inches.

79 Electrode embedded in nonconductor mounting block. May be steel rod, may be about 0.1 inch in molded refractory or ceramic base.

80 Vent door between IR sensor chamber and exhaust vent. For example, 3×2 inches.

81 Linkage between IR sensor chamber door and flap moving under fan from air under negative pressure. For example, stainless steel sheet 0.075 inches thick.

82 Flap moving from air under negative pressure. For example aluminum sheet, 0.080 inches thick.
83 Baffle/Shutter linkage between vent door for IR sensor chamber and shutter that opens over port in insulated exhaust vent wall. For example, made of sheet metal, stainless steel, 0.075 inches thick.
84 IR sensor chamber ventilated by negative pressure. For example, 4×6×8 inches, made of stainless-steel sheet. For example, 0.075 inches thickness.
85 Burner (Separate soak burner with constant adjustable fuel supply) 86 Ventilation fan for oven door. For example, Sanyo Denki San Ace 120 L 24 VDC. 1500 Wyatt Dr. St 5, Santa Clara Calif. 95054
87 Negative pressure space between exterior surface structure of oven and the structural boundary of the oven wall insulation layer. For example, 0.125-3 inches wide. Preferably about 1 inch wide. This area is open at the top to the negative pressure of the vent, and open to atmosphere at the bottom of the space.
88 Burner (Separate floor ramp burner, with variable adjustable fuel supply)
91 Pilot manual gas valve
92 Pilot manual light burner
93 Forced Air Burner Duct Floor Burner 0.080 bent aluminium sheet and 3/16 aluminium plate
94 Forced Air Burner Duct Dome Burner: 0.080 bent aluminium Sheet and 3/16 aluminium plate
95 Forced Air Burner Fan: Sanyo Denki San Ace 80L 24 VDC. Wyatt Dr. St 5, Santa Clara Ca 95054
96 Forced Air Burner Fan: Sanyo Denki San Ace 80L 24 VDC. Wyatt Dr. St 5, Santa Clara Ca 95054
97 Rocker Switch, off on, general power to oven
98 Rocker Switch, off on, powers electronics and solenoid valves
99 Rocker Switch, off on,powers light shining in vent to illiminate baking chamber
100 Rocker Switch, off on,powers lighting display for art on top of oven
101 Three position switch, allows selection of direction of rotation of oven floor
102 Carousel Pillar. Supported by rotating carousel base, supporting oven floor. Made of Hymor KK (same as floor plate)
103 Burner Platform, fixed in position at the center of rotating Carousel Base, supporting burner in fixed position. Made of light weight insulating concrete 19 pounds per cubic foot.
104 Rotating Carousel Base, supported on perimeter bearing, supporting Carousel Pillar. Made of light weight insulating concrete 19 pounds per cubic foot.
105 Valve Manifold made of square aluminium tubing 1.5×1.5 in with 0.25 in wall. All measurements disclosed herein are at standard temperature and pressure, at sea level on Earth, unless indicated otherwise. All materials used or intended to be used in a human being are biocompatible, unless indicated otherwise. The specific brands/materials/parts utilized, as specified in the parts list, are provided for example only as to parts from manufacturers which may be utilized in various embodiments of the present invention. References to specific parts and manufacturers or materials and dimensions are not presented in any way to limit the various embodiments but rather to demonstrate examples of suitable parts, materials and dimensions for the various embodiments. In certain instances, the materials, parts, and dimensions listed are provided as examples of what was utilized in various prototypes of the present inventions.

The foregoing embodiments are presented by way of example only; the scope of the present invention is to be limited only by the following claims.

The invention claimed is:

1. An oven comprising:
a baking chamber;
an oven floor;
a first heat source;
a second heat source;
a first control system; and
a second control system;
wherein the oven floor has a top and bottom surface;
wherein the baking chamber has a front opening and is comprised of a top, at least three walls, and the top surface of the oven floor;
wherein the first control system controls the first heat source that heats the oven floor;
wherein the first control system comprises an infrared sensor, an oven floor temperature controller, and oven floor temperature controller relay;
wherein the oven floor temperature controller has a high and low temperature limit setting;
wherein the infrared sensor of the first control system senses infrared light emissions from the top surface of the oven floor, provides temperature measurements of the top surface of the oven floor, and is located in a position outside of and remote from the baking chamber, the top of the baking chamber and baking chamber walls;
wherein the oven temperature controller of the first control system opens and closes the oven floor temperature control relay to control the first heat source so as to maintain the temperature of the top surface of the oven floor, as measured by the infrared sensor, approximately between the high and low temperature limit setting of the oven floor temperature controller;
wherein the first heat source is located directly underneath the oven floor;
wherein the second control system controls the second heat source that heats the baking chamber;
wherein the second control system comprises a thermocouple that measures the temperature in the baking chamber or the top of the baking chamber, a baking chamber temperature controller, and a baking chamber temperature controller relay;
wherein the baking chamber temperature controller has a high and low temperature limit setting;
wherein the second control system opens and closes the controller relay of the second control system to maintain the temperature of the baking chamber, as measured by the thermocouple, approximately between the high and low temperature limit settings of the baking chamber temperature controller.

2. The oven of claim 1, further comprising a bracket, wherein the infrared sensor is attached to the bracket so as to be located outside of the baking chamber and above the top surface of the oven floor.

3. The oven of claim 1 further comprising one or more baffles positioned between the oven floor and the infrared sensor.

4. The oven of claim 2 wherein the bracket is attached to the oven.

5. The oven of claim 2 wherein the bracket is not attached to the oven.

6. The oven of claim 1 further comprising an insulation layer around the walls and top of the baking chamber, and ports or openings in the top of the baking chamber or walls of the baking chamber, and surrounding insulation layer, allowing the infrared sensor of the first control system to sense the top surface of the oven floor through the baking chamber top or walls and insulation layer.

7. The oven of claim 1 further comprising a forced air system,
wherein the forced air system blows cool air around the infrared sensor of the first control system, or between the oven floor and the infrared sensor to cool the infrared sensor.

8. The oven of claim 1 further comprising a shutter and a solenoid actuator that moves the shutter into an open or closed positon position;
wherein the shutter, when in a closed position, is located so as to block hot gas escaping from the baking chamber from damaging the infrared sensor of the first control system and, when in an open position, allows sensing of the top surface of the oven floor by the infrared sensor.

9. The oven of claim 1 wherein the oven floor rotates.

10. An oven comprising:
a baking chamber;
one or more variable heat sources;
an oven floor, said oven floor having top, bottom, and side surfaces;
one or more infrared sensors; and
a computerized control system,
wherein the one or more infrared sensors are located outside of the baking chamber;
wherein at least one of the one or more infrared sensors measures infrared light emissions from the top surface of the oven floor; and
wherein signals from one or more of the one or more infrared sensors are used by the computerized control system to identify an introduction of a cold pizza into the oven and trigger a computerized burner heat output algorithm to vary temperature over time in a programmed bake cycle and minimize time to return of target temperature in the oven after a baking cycle.

11. The oven of claim 10 further comprising an oven control system, wherein the oven control system includes a proportional signal controller and one or more oven temperature controller outputs which are variable and proportional to the degree that a process temperature deviates from a target temperature setting, providing regulation of the one or more variable heat sources that generate more or less heat depending on the amplitude of an incrementally variable signal from the proportional signal controller.

12. An oven comprising:
a baking chamber;
one or more variable heat sources;
an oven floor, said oven floor having top, bottom, and side surfaces; and
at least two infrared sensors;
wherein the at least two infrared sensors are located outside of the baking chamber; and
wherein at least one of the at least two infrared sensors measures infrared light emissions from the top surface of the oven floor and wherein at least one of the at least two infrared sensors measures infrared light emissions from the bottom surface of the oven floor.

13. The oven of claim 12 further comprising an oven control system, wherein the oven control system includes a proportional signal controller and one or more oven temperature controller outputs which are variable and proportional to the degree that a process temperature deviates from a target temperature setting, providing regulation of the one or more variable heat sources that generate more or less heat depending on the amplitude of an incrementally variable signal from the proportional signal controller.

14. The oven of claim 12 further comprising a computerized control system, wherein signals from one or more of the at least two infrared sensors are used by the computerized control system to identify an introduction of a cold pizza into the oven and trigger a computerized burner heat output algorithm to vary temperature over time in a programmed bake cycle and minimize time to return of target temperature in the oven after a baking cycle.

15. The oven of claim 13 further comprising a computerized control system, wherein signals from one or more of the at least two infrared sensors are used by the computerized control system to identify an introduction of a cold pizza into the oven and trigger a computerized burner heat output algorithm to vary temperature over time in a programmed bake cycle and minimize time to return of target temperature in the oven after a baking cycle.

16. An oven comprising:
a baking chamber;
one or more variable heat sources;
an oven floor, said oven floor having top, bottom, and side surfaces;
one or more infrared sensors; and
an oven control system,
wherein the one or more infrared sensors are located outside of the baking chamber;
wherein at least one of the one or more infrared sensors measures infrared light emissions from the side surface of the oven floor; and
wherein the oven control system includes a proportional signal controller and one or more oven temperature controller outputs which are variable and proportional to the degree that a process temperature deviates from a target temperature setting, providing regulation of the one or more variable heat sources that generate more or less heat depending on the amplitude of an incrementally variable signal from the proportional signal controller.

17. An oven comprising:
a baking chamber;
one or more variable heat sources;
an oven floor, said oven floor having top, bottom, and side surfaces;
one or more infrared sensors; and
a computerized control system,
wherein the one or more infrared sensors are located outside of the baking chamber;
wherein at least one of the one or more infrared sensors measures infrared light emissions from the side surface of the oven floor; and
wherein signals from one or more of the one or more infrared sensors are used by the computerized control system to identify an introduction of a cold pizza into the oven and trigger a computerized burner heat output algorithm to vary temperature over time in a programmed bake cycle and minimize time to return of target temperature in the oven after a baking cycle.

18. The oven of claim 16 further comprising a computerized control system, wherein signals from one or more of the one or more infrared sensors are used by the computerized control system to identify an introduction of a cold pizza into the oven and trigger a computerized burner heat output algorithm to vary temperature over time in a programmed bake cycle and minimize time to return of target temperature in the oven after a baking cycle.

19. The oven of claim 1 further comprising a shutter and an actuator that moves the shutter into an open or closed position;

wherein the shutter, when in a closed position, is located so as to block hot gas escaping from the baking chamber from damaging the infrared sensor of the first control system and, when in an open position, allows sensing of the top surface of the oven floor by the infrared sensor.

\* \* \* \* \*